(12) United States Patent
Opper

(10) Patent No.: US 7,596,858 B2
(45) Date of Patent: Oct. 6, 2009

(54) SELF-PIERCING DEVICE FOR SETTING A RIVET ELEMENT

(75) Inventor: Reinhold Opper, Buseck (DE)

(73) Assignee: Newfrey LLC, Newark, DE (US)

( * ) Notice: Subject to any disclaimer, the term of this patent is extended or adjusted under 35 U.S.C. 154(b) by 345 days.

(21) Appl. No.: 11/431,113

(22) Filed: May 9, 2006

(65) Prior Publication Data

US 2006/0248705 A1    Nov. 9, 2006

Related U.S. Application Data

(63) Continuation-in-part of application No. 10/657,411, filed on Sep. 8, 2003, now Pat. No. 7,040,006, and a continuation of application No. PCT/DE02/00764, filed on Mar. 1, 2002.

(30) Foreign Application Priority Data

| Mar. 9, 2001 | (DE) | ................... | 101 11 692 |
| Apr. 30, 2001 | (DE) | ................... | 101 21 218 |
| Dec. 11, 2001 | (DE) | ................... | 101 60 771 |

(51) Int. Cl.
*B23P 21/00* (2006.01)
*B23P 19/00* (2006.01)

(52) U.S. Cl. .......................... 29/716; 29/798

(58) Field of Classification Search .................. 29/716, 29/798, 525.06, 34 B, 243.53, 432, 407.08, 29/524.1; 219/157, 50
See application file for complete search history.

(56) References Cited

U.S. PATENT DOCUMENTS

| 2,148,977 A | 2/1939 | Buck |
| 2,188,422 A | 1/1940 | Waner |
| 2,369,670 A | 2/1945 | Gookin |
| 2,392,133 A | 1/1946 | Eklund |
| 2,588,907 A | 3/1952 | Colley |
| 2,803,984 A | 8/1957 | Swenson |
| 2,887,926 A | 5/1959 | Edwards |
| 3,030,705 A | 4/1962 | Gill |
| 3,263,250 A | 8/1966 | Vaughn |
| 3,403,593 A | 10/1968 | Moore |
| 3,477,336 A | 11/1969 | Thorpe |
| 3,659,449 A | 5/1972 | Abernathy |
| 3,691,924 A | 9/1972 | Baker |
| 3,906,776 A | 9/1975 | Humphreys et al. |
| 3,909,913 A | 10/1975 | Tildesley |
| 3,971,116 A | 7/1976 | Goodsmith et al. |
| 4,130,922 A | 12/1978 | Koett |
| 4,178,669 A | 12/1979 | Hara et al. |
| 4,307,598 A | 12/1981 | Andrich |

(Continued)

FOREIGN PATENT DOCUMENTS

DE    2004010    8/1970

(Continued)

*Primary Examiner*—John C Hong
(74) *Attorney, Agent, or Firm*—Harness, Dickey & Pierce, P.L.C.

(57) ABSTRACT

A system useful for riveting sheets of metal together. The system having a fastening element having a head on one side and a self-piercing surface on an opposite end, a die having an elastically moveable annular stop and a ring boost, and a ram assembly operably punching the piercing surface into a sheet. The fastening element may be a self-piercing rivet.

21 Claims, 14 Drawing Sheets

U.S. PATENT DOCUMENTS

| | | | |
|---|---|---|---|
| 4,404,742 | A | 9/1983 | Fuhrmeister |
| 4,499,647 | A | 2/1985 | Sakamura et al. |
| 4,781,500 | A | 11/1988 | Mauer |
| 4,836,728 | A | 6/1989 | Mauer et al. |
| 5,066,446 | A | 11/1991 | Phillips, II |
| 5,110,029 | A | 5/1992 | Blake |
| 5,125,151 | A | 6/1992 | Smart |
| 5,167,585 | A | 12/1992 | Williams |
| 5,237,733 | A | 8/1993 | Ladouceur et al. |
| 5,259,713 | A | 11/1993 | Renner et al. |
| 5,323,946 | A | 6/1994 | O'Connor et al. |
| 5,337,463 | A | 8/1994 | Rössler et al. |
| 5,403,135 | A | 4/1995 | Renner et al. |
| 5,469,610 | A | 11/1995 | Courian et al. |
| 5,490,312 | A | 2/1996 | Smith |
| 5,502,888 | A | 4/1996 | Takahashi et al. |
| 5,600,878 | A | 2/1997 | Byrne et al. |
| 5,645,383 | A | 7/1997 | Williams |
| 5,658,107 | A | 8/1997 | Smith |
| 5,661,887 | A | 9/1997 | Byrne et al. |
| 5,666,710 | A | 9/1997 | Weber et al. |
| 5,727,302 | A | 3/1998 | Sawdon |
| 5,752,305 | A | 5/1998 | Cotterill et al. |
| 5,759,001 | A | 6/1998 | Smith |
| 5,960,667 | A | 10/1999 | Hylwa et al. |
| 6,032,510 | A | 3/2000 | Smith et al. |
| 6,115,900 | A | 9/2000 | Cerulo et al. |
| 6,224,310 | B1 | 5/2001 | Summerlin et al. |
| 6,244,808 | B1 | 6/2001 | Donhauser |
| 6,254,324 | B1 | 7/2001 | Smith et al. |
| 6,276,050 | B1 | 8/2001 | Mauer et al. |
| 6,338,601 | B1 | 1/2002 | Mauer et al. |
| 6,362,448 | B1 | 3/2002 | Röser |
| 6,398,096 | B1 | 6/2002 | Lang |
| 6,398,472 | B1 | 6/2002 | Jones |
| 6,417,490 | B1 | 7/2002 | Liebrecht et al. |
| 6,418,599 | B2 | 7/2002 | Suzuki et al. |
| 6,428,255 | B1 | 8/2002 | Smith |
| 6,502,008 | B2 | 12/2002 | Maurer et al. |
| 6,543,115 | B1 | 4/2003 | Mauer et al. |
| 6,568,062 | B1 | 5/2003 | Opper et al. |
| 6,568,236 | B2 | 5/2003 | Kondo et al. |
| 6,676,000 | B2 | 1/2004 | Lang et al. |
| 6,742,420 | B2 | 6/2004 | Aldama |
| 6,789,309 | B2 | 9/2004 | Kondo |
| 6,826,820 | B2 | 12/2004 | Denham et al. |
| 6,857,175 | B2 | 2/2005 | Blöcher et al. |
| 6,910,263 | B2 | 6/2005 | Naito |
| 6,942,134 | B2 | 9/2005 | Naito |
| 6,961,984 | B2 | 11/2005 | Naito et al. |
| 6,964,094 | B2 | 11/2005 | Kondo |
| 6,968,939 | B1 | 11/2005 | Mauer et al. |
| 7,024,270 | B2 | 4/2006 | Mauer et al. |
| 7,040,006 | B2 | 5/2006 | Mauer et al. |
| 7,043,826 | B2 | 5/2006 | Naito |
| 2004/0107557 | A1 | 6/2004 | Morris et al. |
| 2005/0019137 | A1 | 1/2005 | Iwatsuki et al. |

FOREIGN PATENT DOCUMENTS

| | | |
|---|---|---|
| DE | 2334385 | 1/1975 |
| DE | 2654718 | 6/1978 |
| DE | 2739166 | 3/1979 |
| DE | 1625359 | 6/1979 |
| DE | 3744450 | 10/1989 |
| DE | 19816198 | 10/1999 |
| DE | 10323740 | 12/2004 |
| EP | 0351715 | 1/1990 |
| FR | 1300424 | 6/1962 |
| GB | 1275202 | 2/1970 |
| WO | WO9925510 * | 5/1999 |
| WO | WO 02073045 | 9/2002 |

* cited by examiner

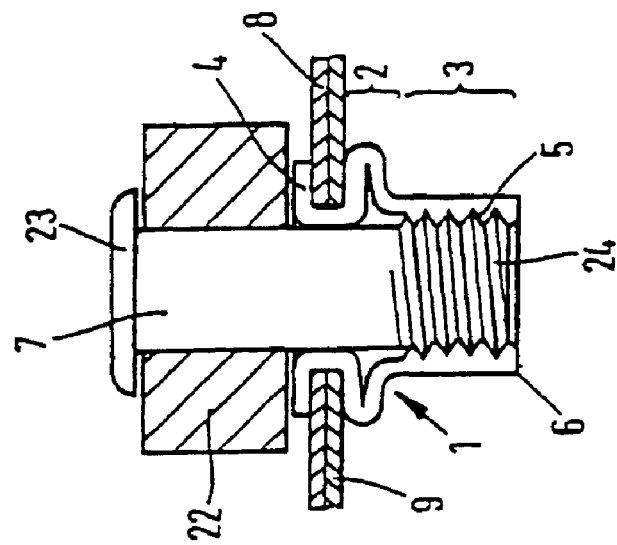
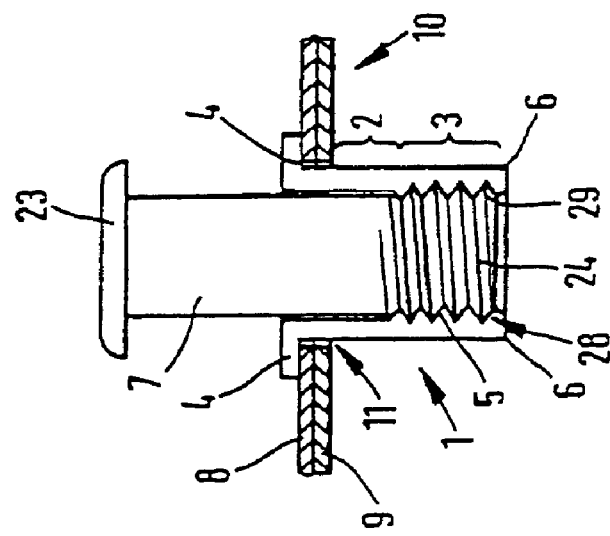
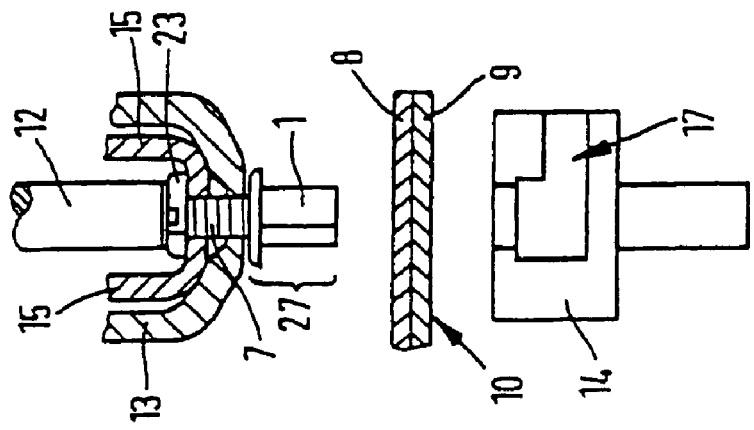

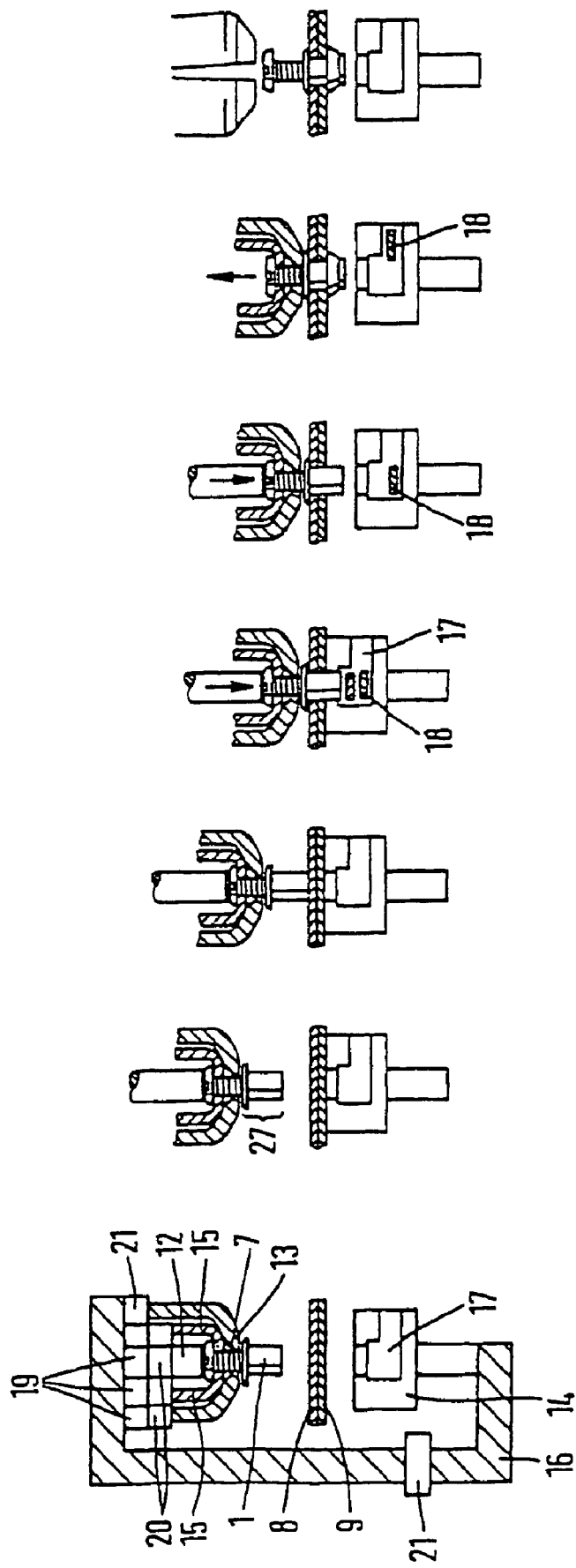

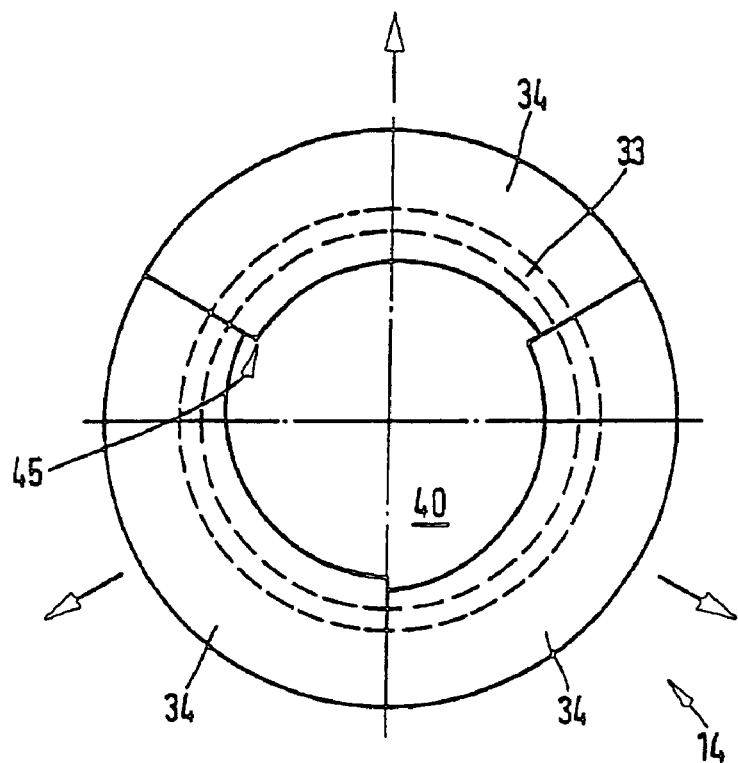
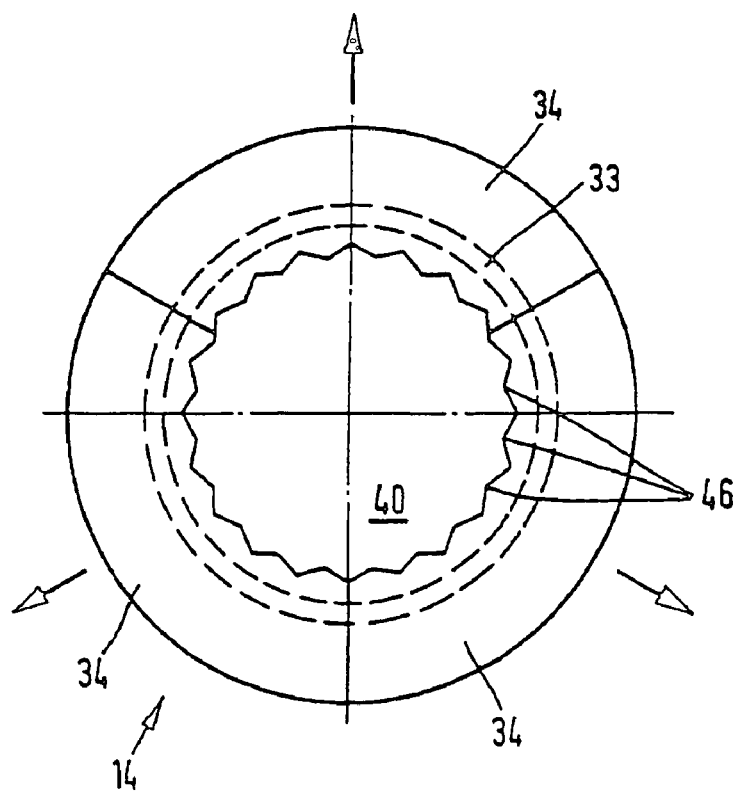

SELF-PIERCING DEVICE FOR SETTING A RIVET ELEMENT

CROSS-REFERENCE TO RELATED APPLICATIONS

This application is a Continuation-in-Part of U.S. patent application Ser. No. 10/657,411, which is a Continuation of International Patent Application No. PCT/DE02/00764, filed Mar. 1, 2002. This application claims the benefit of and priority to German Patent Application No. 10160771.7 filed Dec. 11, 2001, German Patent Application No. 10121218.6 filed Apr. 30, 2001, and German Patent Application No. 10111692.6 filed Mar. 9, 2001. The disclosures of the above applications are incorporated herein by reference.

FIELD

The present disclosure relates to a fastening element, in particular, a self-piercing rivet, and to a process and a device for setting the fastening element, including a punch die. The present disclosure also relates to a riveted connection made by the process and/or device, and to an employment of the riveted connection.

BACKGROUND

Numerous types of rivets are known in the art. Blind rivets are distinguished in that the force required to set the blind rivet is not applied by force-absorbing stirrups on either side of a part to be riveted, but the head and foot of the rivet are pressed together by pulling on a mandrel passing through the interior of the blind rivet, the head being held at the part and the foot pulled toward the head by means of the mandrel.

An advantage of the blind rivet can be the access to only one side of the work is required. Various "designs" have been developed for self-drilling blind rivets, but the creation of self-piercing blind rivets has not been considered since the necessary deformability of the shank does not permit exertion of a piercing force.

A disadvantage of the blind rivet can be the need for holes to be drilled or punched in the work in order to set the blind rivet. This is difficult especially when two parts are to be connected to each other, the parts not being moveable relative to each other. Production of the holes in conjunction with orientation of the parts sometimes presents difficulties, therefore, the drilling and the setting of the rivet should take place in a fixed relative position of the parts. Even in the case of the self-drilling blind rivets, this problem arises during the drilling when two parts to be connected to each other may exhibit a small gap, and upon setting of the rivet, the two parts are shifted toward each other due to the shearing stresses, quality of the riveted connection may be compromised. Another disadvantage with self-drilling blind rivets includes producing chips in the surface of the parts and other such damage.

During self-piercing riveting with a solid rivet, complete filling of the annular groove of the solid rivet by the die side sheet that is being fastened is necessary for the fastening of metal sheets. With current dies, however, this filling of the annular groove is not always completely successful. This is due to the fact that when a solid rivet is being set to the die side sheet, undesirable deformations may occur at the start of the riveting operation. Deformations can occur at the outside margin of the circular ring-shaped annular stop of the die, which is common in riveting hardware, and the displaced material, which flows into deformations, is then unavailable for filling the annular groove of the solid rivet. A disadvantage of current dies in self-piercing riveting with a solid die side sheet is the riveted connection produced in this way does not achieve a strong rivet connection. A further disadvantage can include the displaced material that flows into deformations produces ripples around the rivet joint leaving crater-like deformations around the rivet joint on a smooth surface of the die side sheet.

The teachings of the present disclosure include a rivet element and a device, a die suited to the purpose, and a process for setting said rivet element, and/or a riveted connection and an employment of said riveted connection, whereby the disadvantages described are to be overcome. Furthermore, the teachings also include a rivet element, a device and a process for setting a rivet element, for a riveted connection, and for an employment of said riveted connection.

In addition, the teachings of the present disclosure include a device and a process that ensures strength in a rivet joint using a self-piercing solid rivet and that ensures filling of the annular groove of the rivet. In addition, the teachings also include a device and a process for self-piercing riveting with a solid rivet that prevents crater-like deformations or ripples in the die side sheet and can ensure the bottom of the solid rivet and the bottom of the die side sheet are essentially in the same plane.

SUMMARY

In some embodiments, the fastening element according to the teachings, in particular, for blind riveting, has a hollow shank comprising a setting head at its free end, a deformation segment to form a closure head, and a connecting segment formed inside the shank and serving to form a tension-resistant connection with a mandrel, in particular, with the foot of a mandrel. The connecting segment comprises a punching edge extending substantially along the outermost periphery of the shank at the end of the shank opposed to the setting head.

In some embodiments, a fastening element according to the teachings, in particular, for blind riveting, has a hollow shank comprising a setting head at its free end, a deformation segment to form a closure head, and a mandrel inside the shank comprising a head and a foot, the foot of the mandrel being at least tension-resistantly connected to an end of the shank opposed to the setting head. The end of the shank or the foot of the mandrel includes a punching edge extending substantially along the outermost periphery of the shank or of the foot of the mandrel. Punching forces are transmitted by the mandrel into the foot of the mandrel having the punching edge.

In some embodiments, the fastening elements according to the teachings include the self-piercing and the drawing (to form the closure head) of the fastening elements are combined with each other. This serves to combine advantages of a blind rivet connection with advantages of self-piercing.

A fastening element, according to the teachings, has a hollow interior so that a mandrel can be thrust through the setting head and the deformation segment to achieve an at least tension-resistant connection of the foot of the mandrel and shank end. With the punching edge, while the fastening element is being thrust through a part, a hole is punched in the work. Thus, of course, the punching force must be transmitted by the mandrel into the end of the shank since the deformation segment cannot transmit such a force. By virtue of a sharp punching edge, the punching forces acting on the work are reduced. Likewise, a formation of cracks in the neighborhood of the punched hole is avoided and thereby improving the quality of the riveted connection. The punching edge of the fastening element is a sharp edge and may be substantially rectangular.

The deformation segment is deformed in that the shank end is drawn toward the setting head by means of the mandrel, which is introduced into the hollow shank, and by means of which a tension-resistant connection with the connecting segment is made. By the deformation of the deformation segment, a closure head is formed. With the closure head, for example, two parts can be connected to each other. The deformation segment is either made of softer material than the setting head or the shank end, or else rendered more easily deformable by suitable conformation, for example, by thinner wall thicknesses and/or openings and/or folds in the deformation segment.

As compared with a typical self-piercing rivet, a blind rivet will serve for connections capable of assuming greater tensile and shearing stresses. In the teachings, this advantage is combined with the advantage of no need to search for pre-drilled holes into which the fastening element is to be thrust. Furthermore, any production of chips or other damage in the surface of the parts by the drilling of holes is avoided. By virtue of the self-piercing by the fastening element, the wall of the hole results in advantageous properties of the riveted connection with respect to the maximum allowable tensile and shearing stresses.

In some embodiments of the fastening elements, according to the teachings, the shank and the mandrel, in particular, the foot of the mandrel and the end of the shank, are releasably connectable. Advantages of a releasable connection are, among others, that parts can be fastened to the fastening element by means of the mandrel. Also, a releasable connection permits use of the mandrel as a tool for forming the closure head.

In some embodiments, the shank and the mandrel, in particular, the foot of the mandrel and the end of the shank, are dynamically interlockable. In some embodiments, the shank and the mandrel, in particular, the foot of the mandrel and the end of the shank, are geometrically interlockable. For example, the geometrical connection is produced by a bayonet closure or a screw connection between the shank and the mandrel.

In some embodiments of the teachings, the foot of the mandrel comprises an external thread and the end of the shank has a matching internal thread into which the foot of the mandrel is screwable.

In some embodiments of the teachings, the diameter of the foot of the mandrel is greater than or equal to the outside diameter of the end of the shank and the punching edge is formed on the foot of the mandrel. By means of a punching edge at the foot of the mandrel, a sufficiently large hole is punched out.

In some embodiments of the teachings, the mandrel comprises a weak point. What this accomplishes is that, by means of the mandrel, the hole required for the riveted connection can be punched, and the mandrel can be removed after deformation of the deformation segment.

In some embodiments of the teachings, the setting head is greater in diameter than the deformation segment, the end of the shank, or the foot of the mandrel. This ensures that the fastening element will not be pressed too deep into or even through the work, and the setting head can be held against the work without difficulty if the end of the shank is drawn toward the setting head.

In some embodiments, the fastening element is made of metal, in particular, steel, aluminum, or an aluminum alloy. In some embodiments, the cross-section of the fastening element is essentially circular. Alternatively, the cross-section of the fastening element is essentially polygonal. By a non-circular shape of the cross-section, an additional resistance to twisting of a riveted connection between two parts is achieved. If an internal thread of the fastening element is used for fastening accessory parts, the polygonal shape affords additional security against undesired rotation of the fastening element in the work.

The mandrel may comprise a head greater in diameter than the shank end. By means of the mandrel, a requisite compression for punching the fastening element can be absorbed. The fastening element receives the requisite strength through the mandrel so that the fastening element can be punched into the work. At the enlarged head of the mandrel, the mandrel can be grasped and withdrawn in simple manner.

In some embodiments of the teachings, the end of the shank is open. In an especially advantageous embodiment of the teachings, the end of the shank is closed. A closed shank end results in a comparatively tight riveted connection rendering leakage of gases, liquids, or solids, from one side of the work to the other more difficult.

A process according to the teachings is provided for setting a fastening element comprising a hollow shank having a setting head at its free end, a deformation segment to form a closure head, and a connecting segment formed inside the shank and forming a tension-resistant connection with a mandrel, in particular, with the foot of a mandrel, the end of the shank opposed to the setting head being provided with a punching edge extending substantially along the outermost periphery of the shank, comprises the following steps: The mandrel is introduced into the fastening element and a tension-resistant connection is formed between the mandrel and the shank. The punching operation with the fastening element connected with the mandrel is carried out to form a punched hole in at least one part. The shank is introduced into the punched hole so that the shank extends at least part way into the punched hole. A tension is applied at the mandrel, and the setting head is held against the mandrel to form the closure head.

In some embodiments, a process according to the teachings is provided for setting a fastening element comprising a hollow shank having a setting head at its free end, a deformation segment to form a closure head, and a mandrel inside the shank, the mandrel including a head and a foot, and the foot of the mandrel being at least tension-resistantly connected to a shank end opposed to the setting head, and the shank end or the foot of the mandrel, including a punching edge extending essentially along the outermost periphery of the shank or the foot of the mandrel, the process comprising: The mandrel is introduced into the fastening element and a tension-resistant connection is formed between the mandrel and the shank. The punching operation with the fastening element connected with the mandrel is carried out to form a punched hole in at least one part. The shank is introduced into the punched hole so that the shank extends at least part way into the punched hole. A tension is applied at the mandrel, and the setting head is held against the mandrel to form the closure head.

With the aid of the mandrel, the force required to punch the hole for the fastening element can be transmitted to the work, and using the mandrel, the shank end is drawn toward the setting head. If part of the deformation segment protrudes at the rear of the work, it is deformed, i.e. for example, widened by traction on the mandrel. If the deformation segment does not protrude in the rear, but is located inside the work, the deformation segment is deformed in the interior of the work, and by its widening brings about a clamping, for example, a positive dynamic connection between the fastening element and the work. If the shank end has an internal thread, the internal thread can be arranged in the rear of the work, leading to an enhanced tensional stability.

By means of the fastening element, a plurality of parts can be connected to each other. Since the mandrel absorbs the requisite compressions and/or tensions, there is more latitude in the dimensioning of the fastening element than in the case of the known rivets. In particular, wall thickness can be reduced and rivets can be manufactured with less consumption of material. Once the fastening element has been set and the deformation segment deformed, the mandrel can either be screwed out or forced out with the aid of a weak spot in the mandrel. The thread may be used, if desired, to attach accessories such as, for example, lines, holders, fairings, or housing parts, or the thread may serve simply to accommodate a covering stopper.

In some embodiments of the teachings, at least two parts are connected to each other by means of the fastening element while punching through at least one part. Any additional parts and components may be fastened to the fastening element. In particular, the at least two parts are permanently connected to each other by the deformation of the deformation segment.

In some embodiments of a process according to the teachings, a fastening element is pressed into the work with a preassignable force and/or by a preassignable distance. To absorb the forces involved in the punching, the work is backed by a die, largely avoiding any plastic deformation of the work in the vicinity of the punched hole. The forces due to the punching are transmitted to the work by way of a leading edge of the fastening element. With the aid of the preassignable force, in particular, by preassigning a suitable force curve and/or the preassignable distance, the properties of the riveted connection are positively influenced.

In some embodiments of the teachings, a screwed connection is formed between the mandrel and the fastening element. Depending on the process variant, the mandrel pertains to the fastening element or to the device of a setting machine. In the case of a setting machine containing a mandrel, the mandrel is introduced, for example, screwed in just before the setting of the fastening element, and then the fastening element is set with the aid of the mandrel. The mandrel may be removed from the set fastening element, for example, unscrewed. In particular, the connection between the mandrel and the fastening element can be released and/or produced after the forming of the closure head. That is, the set fastened fastening element may, for example, be employed as a threaded bore for fastening of objects.

In a device, according to the teachings for setting a fastening element in at least one part, the device comprises a die, a ram containing a mandrel releasably connectable to the fastening element, and a holding tool for holding the setting head against the work, the ram and the holding tool being moveable toward and away from the die independently of each other in a defined manner.

A modification of the device according to the teachings for setting a fastening element into at least one part comprises a die, a ram for punching the fastening element through the at least one part, a holding tool for holding the setting head against the work, and a pulling tool for retracting the mandrel, the ram and the holding tool are moveable toward and away from the die independently of each other in a defined manner.

In some embodiments of the teachings, a device comprises a disposal passage in the die to dispose of punched parts. With the aid of the disposal passage, parts punched out are carried away from the work and safely disposed of in simple manner.

In some embodiments of the teachings, the ram and the die are connected for dynamic interlock with a counterforce closure structure, also known as a C-stirrup. Through the counterforce closure structure, the forces occurring during punching are absorbed and a lateral displacement of at least one part is avoided. This considerably enhances precision in the setting of the fastening element.

In some embodiments of the device according to the teachings, means are present for moving and/or determining the position of the ram and/or of the holding tool, and/or force sensors to detect the forces arising in the setting of the rivet. With the aid of the position-determining means, the thickness of the part and the length of the fastening element to be set are checked. The force sensors can monitor how strongly at least two parts are pressed together, or with what force the deformation of the deformation segment takes place. Knowledge of the forces employed and a corresponding control of the means of moving with the aid of the means of determining position allow for optimization of the riveted connection.

In some embodiments, the teachings provide for the releasable fastening of accessory parts, in particular, lines, holders, fairings, or housing parts, to the work. Thus, the riveted connection according to the teachings has two functions: it permits the connection of at least two parts to each other and it permits the fastening of accessories to the work.

In some embodiments, a die, according to the teachings, having a punch opening of variable diameter for setting a fastening element into at least one part comprises at least two segments to accommodate punching forces, said segments forming a punch opening enlargeable in diameter to accommodate a closure head of the fastening element, said segments being moveable lodged in a die mount and the segments being held together by at least one spring element.

The enlargeable punch opening provides adequate space for forming a closure head during the traction on the mandrel, backed up by the setting head. The closure head presses the segment radially outward so that the punch opening is independently enlarged in diameter.

In some embodiments, the punch opening is enlargeable and the die may be employed, after the punching operation when the closure head is formed, as a stop for the work. In particular, the die need not be removed after the punching operation to make room for the closure head. This is especially important when a plurality of parts is to be connected to each other and it is to be ensured that the parts do not shift against each other. With the aid of the die, according to the teachings, it is possible, during the entire operation of setting the fastening element, to keep two parts to be connected to each other under constant pressure thereby improving the hole walls of the riveted connection.

In some embodiments, the segments are moveable and the die becomes floating, that is, upon lateral displacement of the fastening element and the die by means of the spring element, the segments are held together so that after completion of an operation of setting the fastening element, the segments automatically return to their original position. This returns the die, according to the teachings, to its original state. The segments are so formed that they are able to absorb great forces in the punching direction without becoming laterally unstable and slipping away, but can be opened in simple manner by radial forces directed away from the punch opening and generated by the forming of a closure head.

In some embodiments of the die according to the teachings, the segments are radially displaceable. A radial displacement of the segments affects an especially easy opening of the die. Alternatively, the segments are so formed, or so mounted on an axis, that the segments execute a rotary or tilting motion.

In some embodiments of the die, according to the teachings, the segments comprise a substantially planar bearing surface and the die mount a substantially planar matching surface for transmitting the punching forces to the die mount. Owing to the planar surfaces, great punching forces can be absorbed by the segments and transmitted to the die mount, ensuring a stable lodgment of the segments in the punching operation.

In some embodiments of the die according to the teachings, the segments comprise receptacles for spring elements. A spring element is guided in the receptacles. This makes it possible for the segments, after completion of a setting operation, to return into their original position and be available for another setting operation.

In some embodiments of the die, according to the teachings, the die comprises a die mount containing an annular stop. With the aid of the annular stop, the part to be fastened is firmly held during the setting operation, in particular, ensuring that any lateral motion of the work is avoided. The annular stop prevents lateral displacement of the segment. The annular stop affects a secure retention of the object during the setting operation.

In some embodiments of the die according to the teachings, the annular stop for ensuring mobility of the segments during the operation of setting the fastening elements comprises an annular stop surface and the segments comprise a segment stop surface, the segment stop surface being located, in relation to the work, at a distance from 0.1 to 0.3 mm, preferably from 0.15 to 0.25 mm, behind the annular stop surface. In such arrangements of the segment stop surfaces, the annular stop of the die mount is arranged closer to the work than the segment. The result of this is that the work is securely held by the annular stop and that any slippage of the work during the punching operation or the riveting operation is prevented. In some embodiments, the segments may be able to move radially (floating) even in a pre-stressed condition of the work.

In some embodiments of the die according to the teachings, the die comprises less than 5, in particular 4, and preferably 3 segments. In some embodiments of the die according to the teachings, the spring element is formed by a rubber ring. The spring element ensures that the moveable segments, after completion of the operation of setting a fastening element, are automatically shifted back into their original position. In some embodiments of the die according to the teachings, the spring element is a spiral ring. In some embodiments, the spring element may include, for example, a spring, an elastomer, pressurized gas, pneumatics, an electronically controlled resistance, hydraulics, and the like.

In some embodiments, the die according to the teachings comprises a transverse vent hole with which punched-out parts can be removed through a disposal passage by means of compressed air.

In some embodiments, the die may comprise an annular stop that is elastically moveable. The annular stop may be elastically moveable in an up and down motion on an axis parallel with the punch opening. The elastically moveability of the annular stop may be accomplished by using a spring, an elastomer, pressure, hydraulics, and the like.

In some embodiments, the die comprises a ring boost. The ring boost, in combination with the elastically moveable annular stop, is advantageous when employed with a self-piercing riveting system with a solid rivet. The ring boost employed with the moveable annular stop is advantageous by minimizing deformation on the die side sheet and by ensuring complete filling of an annular groove in a solid rivet. In addition, using the ring boost in combination with the moveable annular stop is advantageous for increased quality of the rivet joint both in the strength and in the smoothness of the underside sheet.

In some embodiments, when a self-piercing rivet is used, segments in a die may be stationary and the elastically moveability may not be needed. In some embodiments, when a self-piercing rivet is used, segments may be elastically moveable. In some embodiments, an elastically moveable segment or annular stop may include, for example, a spring, an elastomer, pressurized gas, pneumatics, electronically controlled resistance, hydraulics, and the like. In some embodiments, the segments in a die may be in the form of a one piece ring. The segments in a die each have a bearing surface resting on the die mount.

To prevent a rotation of the fastening element relative to the work, or a rotation of two parts relative to each other, the punch opening formed by the segments is rotationally asymmetrical in cross-section. Advantageously, the punch opening is substantially polygonal in cross-section. To further support a protection against rotation, the segments are provided with teeth, so that the punch opening comprises a toothing in cross-section. With the aid of the rotationally asymmetrical punch opening, a corresponding rotationally asymmetrical punched hole is formed, with which the fastening element, even if of rotationally symmetrical configuration as such, will make smooth contact during its deformation. Combining the fastening element with the rotationally asymmetrical punched hole achieves a rotationally fixed connection.

In some embodiments, a self-piercing solid rivet comprises an annular groove around the shank of the rivet. In some embodiments, the self-piercing rivet has an angular piercing surface for which is advantageous for self-aligning and/or self-centering. In some embodiments, the angular piercing surface may come to a point. In some embodiments, the angular piercing surface has an angle of less than 10%. In some embodiments, the angular piercing surface has an angle of less than 5%. In some embodiments, the angular piercing surface has an angle of about 3%. In some embodiments, the self-piercing solid rivet and annular groove edge is located on the body head of the rivet. In some embodiments, the annular groove has likewise extended from a rivet head edge bordering on the shank to a rivet foot edge bordering on the shank. Therefore, in some embodiments, the annular groove extends over the complete shank in a length-wise direction of the rivet, the shank being bound by the head and the foot of the rivet.

In some embodiments, the self-piercing rivet may be configured as a solid rivet or a half-hollow rivet. In some embodiments, the rivet head may be configured as a standard head or an oversized head. Both the standard head and the oversized head may be sized to a stable configuration of the connection that was created along with the foot and the annular groove. In some embodiments, the self-piercing rivet may be made of metal, in particular, steel, aluminum, and aluminum alloys. In some embodiments, a self-piercing rivet is made of a material whose hardness is greater than the material of the parts to be connected to each other. In some embodiments, a rivet as described in DE 103 23 740 issued Dec. 23, 2004 or in U.S. Pat. Nos. 6,244,808 and 6,417,490 may be especially advantageous in use with these teachings.

In some embodiments, the sheets that are to be connected using the self-piercing rivet may be metal, but sheets of other materials may be used. In some embodiments, the sheets to be connected may be a synthetic material sheet such as, for example, a plastic, a carbon fiber, a fiberglass, combinations thereof, combinations with metals or other materials, and the like and a metal sheet that is positioned on the die side. In some embodiments, the larger annular groove may be more effective for fastening two sheets of different materials. In some embodiments, the metal sheets to be fastened with the self-piercing rivet have the thickness of at least 1 mm. In some embodiments, the metal sheets may be used for construction of a motor vehicle.

In some embodiments, a riveting system that may be used for forming a riveted joint using a self-piercing rivet may include systems, devices, or components thereof described in U.S. Pat. Nos. 6,276,050, 6,502,008, 6,543,115, 6,568,062, 6,568,236, 6,789,309, 6,910,263, 6,942,134, 6,961,984, and and 6,964,094 all of which are incorporated herein.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

FIG. 1 is a fragmentary sectional view showing a fastening element according to the present teachings with a mandrel thrust into a piece of work;

FIG. 2 is a sequenced flow diagram showing a process routine according to the present teachings, in which the fastening element containing a mandrel is set by a device for setting a fastening element in a part;

FIG. 3 is a fragmentary sectional view showing a riveted connection according to the present teachings, an accessory part being attached to the work by means of the mandrel;

FIG. 4 is a fragmentary sectional view showing a portion of a device according to the present teachings for setting a fastening element with a fastening element and a part shortly before the fastening element is set;

FIG. 11 is a fragmentary top view showing a die according to the present teachings having a rotationally asymmetrical punch opening;

FIG. 12 is a fragmentary top view showing a die according to the present teachings having an additional rotationally asymmetrical punch opening;

DETAILED DESCRIPTION

Figure 5:
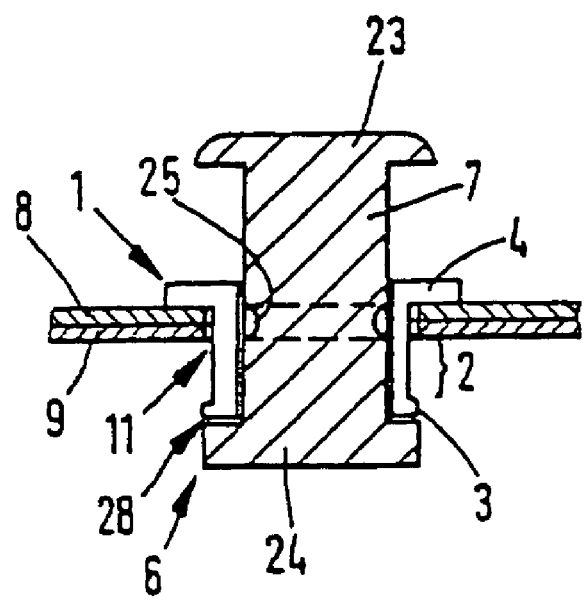
FIG. 5 is a fragmentary sectional view showing an alternative embodiment of a fastening element according to FIG. 1, having a mandrel thrust into a part.

The following description is merely exemplary in nature and is not intended to limit the present disclosure, application, or uses. It should be understood that throughout the drawings, corresponding reference numerals indicate like or corresponding parts and features.

FIG. 1 shows a fastening element 1 according to the teachings, having a setting head 4, a deformation segment 2 and a shank end 3 with an internal thread 5 and a punching edge 6, hollow, into which a mandrel 7, having a head 23 and a foot 24, is screwed. The tension-resistant connection between the mandrel 7 and the shank 27 is made by means of a connecting segment 28. The connecting segment 28 is made up of an internal thread 5 in the shank 27. The internal thread 5 is screwed onto an external thread 29 on the mandrel 7. The fastening element 1 is punched through a first part 8 and a second part 9, the two parts 8, 9 having the aspect of sheets lying one upon another. The fastening element 1 punches its own hole 11 through the parts 8, 9. The shank end 3 and part of the deformation segment 2 are located in the rear 10 of the second part 9. The deformation segment 2 has a thin wall thickness compared to the shank end 3. The mandrel 7 includes a head 23, to which accessory part 22 (not shown) can be fastened, and with which the mandrel 7 can be drawn toward the setting head 4. The setting head 4 rests firmly on the first part 8.

FIG. 2 describes a routine operation of setting a fastening element 1 according to the teachings. In the fastening element 1, according to the teachings, held by a holding tool 13, a mandrel 7 is screwed in. With the aid of moving means 19, the fastening element 1 is placed on a first part 8 to be connected to a second part 9. The location of the fastening element 1 relative to the parts 8, 9 is detected with the aid of positioning means 20. The parts 8, 9 are first placed on a die 14, comprising a disposal passage 17 for punched-out parts 18. Then, the fastening element 1, with the aid of the holding tool 13, is so placed on the first part 8 that the shank end 3 of the fastening element 1 contacts the first part 8. Then, with the aid of a ram 12, a force is exerted on the mandrel 7 so that the shank end 3 is thrust through the parts 8, 9. Meanwhile, in the motion of the ram 12, both the holding tool 13 and a traction tool 15 are carried along. Punched-out parts 18 drop into the disposal passage 17, where they are disposed of, preferably with the aid of a positive or negative pressure line. Then, the die 14 is removed from the parts 8, 9 so that the shank end 3, or the protruding deformation segment 2, as the case may be, is freed. Next, the traction tool 15 pulls the mandrel 7, while the holding tool 13 presses the setting head 4 against the first part 8. The traction deforms the deformation segment 2, whereas the shank end 3 is not plastically deformed. With the aid of force sensors 21, the traction and the punching are monitored, and the motion of the traction tool 15 and/or holding tool 13 is controlled according to the data detected by the force sensors 21. Finally, the mandrel 7 can be screwed out of the fastening element 1, or an accessory part 22 can be fastened with it.

FIG. 3 shows a riveted connection made in the manner described, the deformation segment 2 of the fastening element 1 being deformed. With the aid of the mandrel 7 and its head 23, an accessory part 22, which may be a suspension, is fastened to the parts 8, 9. The parts 8, 9 are firmly clamped between the setting head 4 and the deformation segment 2.

FIG. 4 shows a detail view of the device for setting the fastening element 1. The fastening element 1 is held with the aid of the holding tool 13 on the mandrel 7 screwed into the fastening element 1. The traction tool 15 grasps the mandrel 7 by its head 23. The ram 12 presses down on the head 23 of the mandrel 7. The parts 8, 9 are arranged between the fastening element 1 and the die 14, the die 14 absorbing the force transmitted by the ram 12 by way of the mandrel 7 to the parts 8, 9 from the rear 10 of the second part 9.

FIG. 5 shows an embodiment of the fastening element 1 according to the present teachings as in FIG. 1, having a mandrel 7 thrust into two parts 8, 9. The hole 11 was punched in the parts 8, 9 with the punching edge 6 formed at the foot 24 of the mandrel 7. With the aid of the head 23, the mandrel 7 can be retracted so that first the deformation segment 2 is deformed, and then the head 23 of the mandrel 7 tears off from the foot 24 at a weak point 25. The punching edge 6 is formed by a sharp, essentially rectangular edge of the foot 24 of the mandrel. The tension-resistant connection between mandrel 7 and shank 27 is made by the connecting segment 28.

Figure 6:
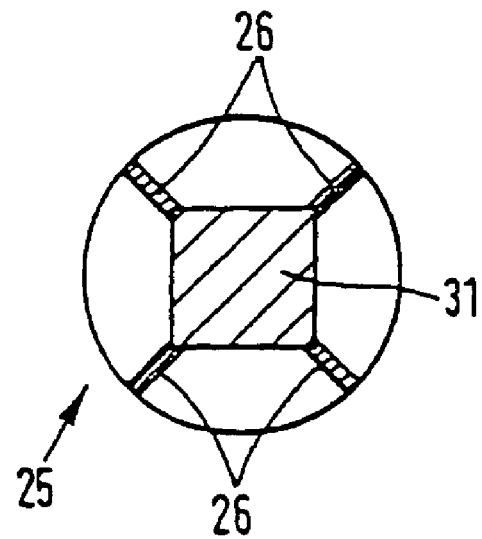
FIG. 6 is a fragmentary sectional plan view showing the weak spot of the mandrel.

FIG. 6 shows the weak point 25 of the mandrel 7 in cross-section, where the mandrel 7 tapers down to a square core 31 with webs 26 at each corner. The webs 26 contribute to the guidance of the mandrel 7 in the fastening element 1 and prevent a lateral shearing or buckling of the mandrel 7 under the action of the compressions during the punching operation.

Figure 7:
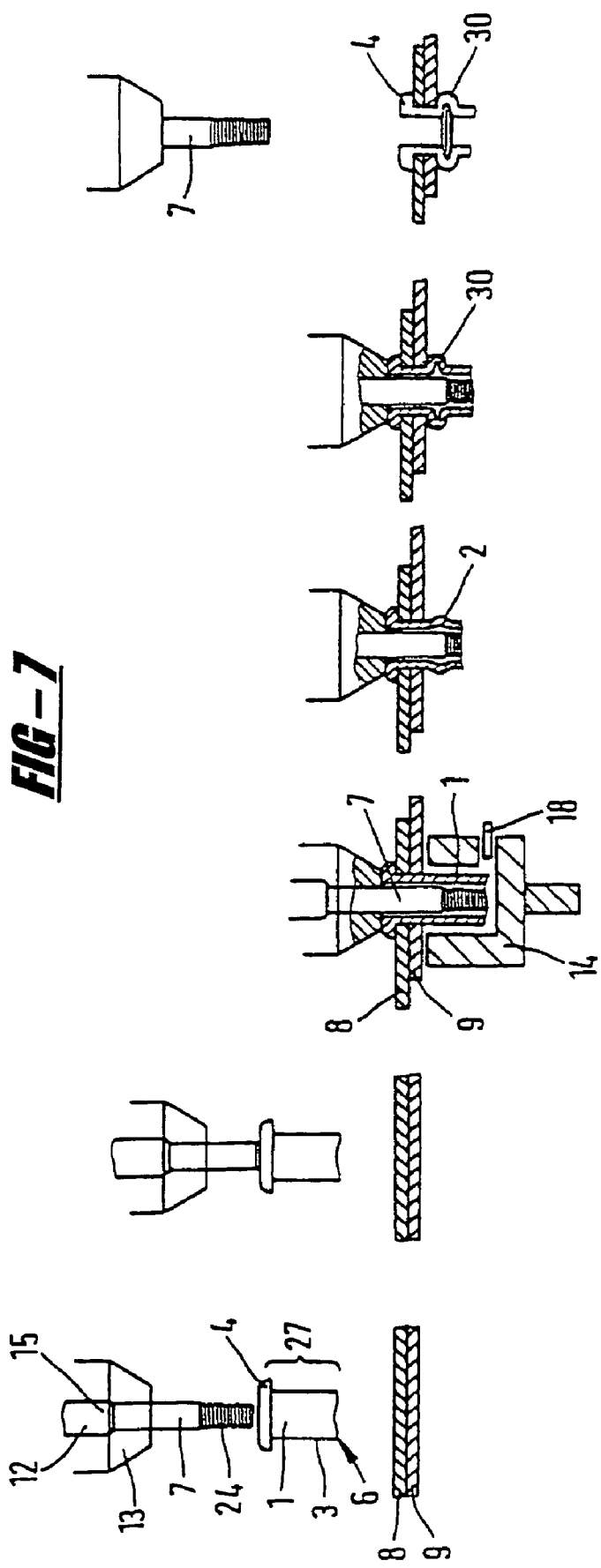
FIG. 7 is a sequenced flow diagram showing an alternative process routine according to the present teachings in which the fastening element is set in a part by a device for setting a fastening element comprising a mandrel.

FIG. 7 describes an alternative process routine according to the teachings for setting a fastening element 1 according to the teachings. A mandrel 7, as part of the setting machine, is operably connected to a ram 12. The mandrel 7 comprises a foot 24 by which the mandrel 7 is screwed into the fastening element 1. The fastening element 1 comprises a setting head 4 and a shank end 3, the shank end 3 being provided with a punching edge 6. First, the mandrel 7 is screwed into the fastening element 1. Then, the punching operation is carried out. Here, the punching edge 6, by dynamic action of the mandrel 7, punches a hole in the parts 8, 9. Here, the die 14 absorbs the forces involved. Thereupon, by retraction of the mandrel 7 and holding down the setting head 4, the deformation segment 2 is deformed. A closure head 30 is formed. Finally, the mandrel 7 is screwed out of the fastening element 1 and is available for the next setting operation.

Figure 8:
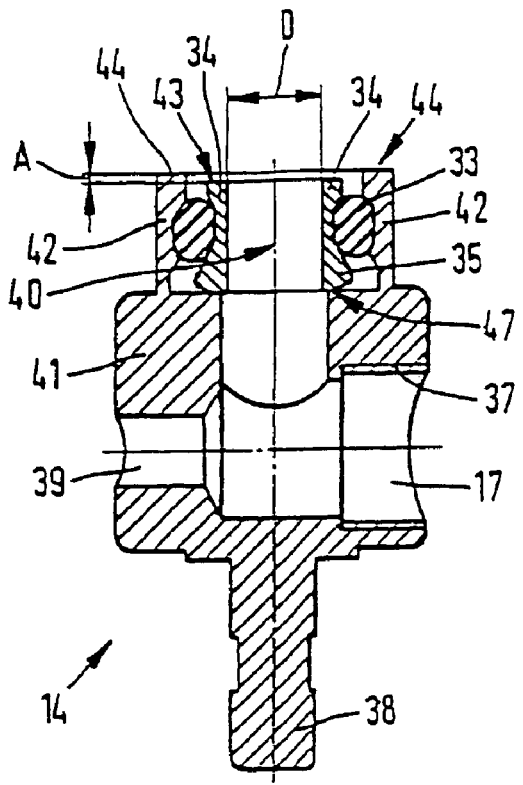
FIG. 8 is a cross-sectional view showing a die according to the present teachings.

FIG. 8 shows a die 14 according to the teachings in cross-section. The die 14 comprises a die mount 41 absorbing the punching forces by way of moveable segments 34. The moveable segments 34 are held together with the aid of a spring element 33. The moveable segments 34 open of their own accord when a closure head 30 (not shown) is formed. The closure head 30 presses the moveable segments 34 apart against the force of the spring element 33. The moveable segments 34 each have a bearing surface 35 resting on the die mount 41. The segments 34, moreover, comprise a segment stop surface 43, by way of which punching forces are transmitted to the moveable segments 34 and, by way of the bearing surface 35, to the die mount 41.

The die mount 41 contains an annular stop 39 encircling the moveable segments 34. The annular stop 39 has an annular stop surface 44 with which a part (not shown) is held. The part is securely held by the annular stop surface 44, since the segment stop surface 43 is arranged farther away relative to the work. The distance A between the segment stop surface 43 and the annular stop surface 44 is about 0.2 mm. The moveable segments 34 form a punch opening 40 through which a punched part (not shown) can be pressed.

With the aid of a vent hole 39 and a disposal passage 17, the punched part is removed by means of compressed air. A threaded connection 37 makes possible the simple attachment of a disposal hose (not shown) to the disposal passage 17. The die mount 41 is attached by means of a counterbearing receptacle 38 to a counterforce structure such as, for example, a C-stirrup (not shown).

Figure 9:
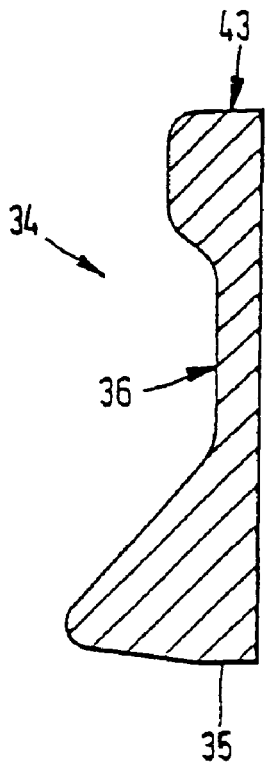
FIG. 9 is a cross-sectional view showing a segment of the die according to the present teachings as in FIG. 8, in longitudinal section.

FIG. 9 shows a single segment 34 of a die 14 according to the teachings as in FIG. 8, in longitudinal section. The segment 34 comprises a segment stop surface 43 and a bearing surface 35. The bearing surface 35 is planar so that punching forces can be safely transferred to the die mount 41 by way of the segment stop surface 43 and the bearing surface 35 without having the moveable segment 34 move laterally away from the punch opening 40 radially. The moveable segment 34 comprises a spring element receptacle 36 in which a spring element 33 is guided. The spring element 33 is fabricated as an O-ring of rubber. Owing to the aspect of the moveable segment 34, it is not necessary to lodge the individual moveable segment 34 with the aid of a shaft (not shown). The moveable segment 34 may be displaced radially and not be tilted. Alternatively to this aspect, each moveable segment 34 may be mounted with the aid of a shaft, each moveable segment 34 being tilted about a center of rotation upon opening of the die 14.

Figure 10:
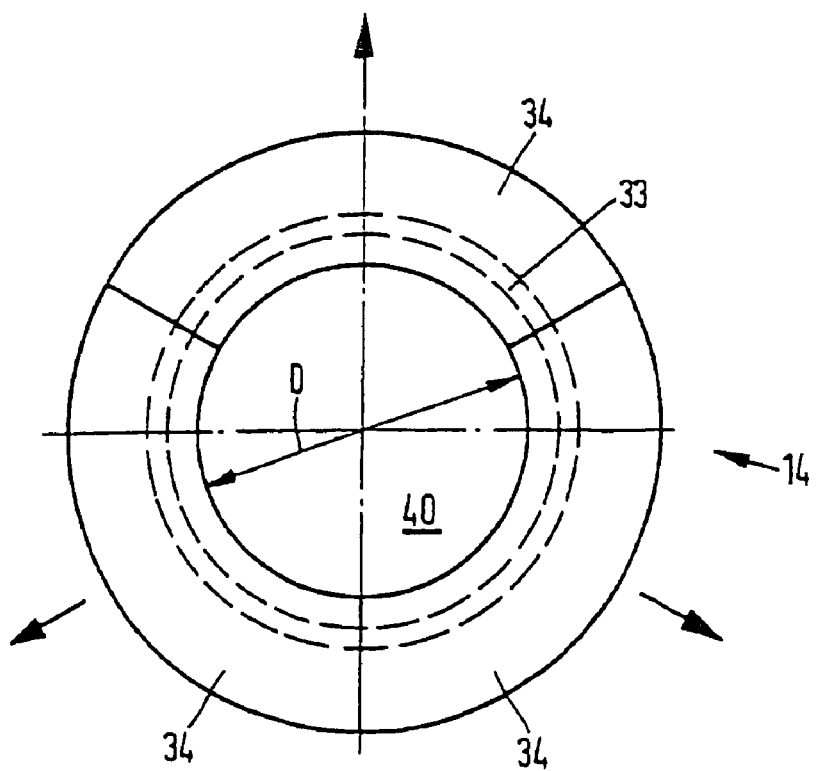
FIG. 10 is a top view showing the three segments of the die according to the present teachings as in FIG. 8.

FIG. 10 shows the three moveable segments 34 of FIG. 8 in top view. It may be seen that the three moveable segments 34 form a ring permitting the absorption of punching forces. The punch opening 40 has a diameter D somewhat greater than the diameter of the fastening element 1 (not shown) to be set. The moveable segments 34 can be held together with the aid of a spring element 33. In the formation of a closure head 30 at the end of the setting operation, the segments 34 are pressed apart so that gaps form between them, enlarging the diameter D of the punch opening 40.

FIG. 11 shows a die 14 according to the teachings, having a rotationally asymmetrical punch opening 40, in top view. Here, the moveable segments 34 form offsets 45 preventing a rotation of the fastening element 1 in the parts 8, 9. This rotation protection is especially advantageous in the case of self-piercing nuts.

FIG. 12 shows a die 14 according to the teachings, having a wider rotationally asymmetrical punch opening 40, in top view, the rotational asymmetry being due to teeth 46 in the several moveable segments 34. In the deformation of the fastening element 1, the periphery of the fastening element 1 makes smooth contact with the teeth 46 of the moveable segments 34 and with the correspondingly toothed parts 8, 9. Detachment of the die 14 from the parts 8, 9 after completion of the setting operation is a simple matter owing to the mobility of the moveable segments 34.

The teachings disclose a fastening element 1, in particular, for blind riveting, having a setting head 4, a deformation segment 2 and a shank end 3, the deformation segment 2 being arranged between the setting head 4 and the shank end 3, and the fastening element 1 being hollow inside, optionally with a mandrel 7 inside the fastening element 1, comprising a head 23 and a foot 24 at least tension-resistantly connected to the shank end 3, the shank end 3 or the foot 24 of the mandrel 7 comprising a punching edge 6 extending substantially along the outermost periphery of the shank end 3, or of the foot 24 of the mandrel 7, and a process for setting the fastening element 1, a riveted connection with the fastening element 1, a device for setting the fastening element 1, an employment of the riveted connection obtained, and a die 14 suitable for the operation of setting the fastening element 1.

The teachings are distinguished in that, in simple manner, especially retentive and tensionally strong, self-piercing blind rivet connections can be produced, the fastening element 1 providing the possibility of attaching an accessory part 22.

Referring to FIGS. 13-16, this series of cross-sectional views illustrate a process of connecting two parts 90, 92 using self-piercing rivet 95. A subassembly generally designated 100, comprising a self-piercing rivet 95 and two parts 90, 92 to be connected to each other, the subassembly 100 being arranged in a self-piercing rivet system which consists of a stamp or ram 93, a die 14, and a holding tool 96.

Figure 17:
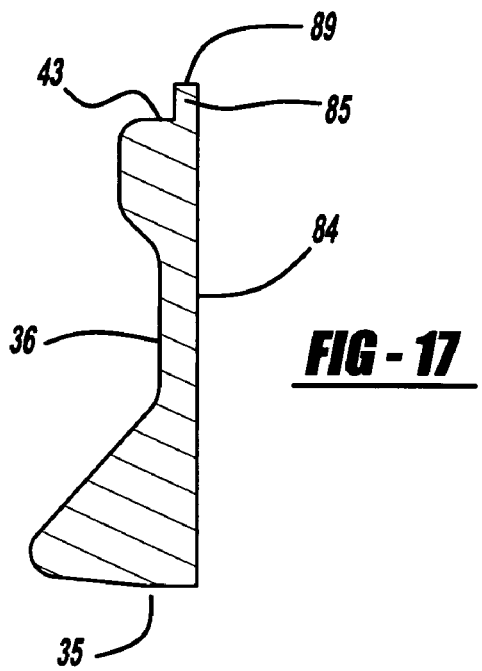
FIG. 17 is a cross-sectional view showing a segment of the die according to the present teachings as in FIGS. 13-16.

The die 14 comprises moveable segments 84 which may be held together with the aid of a spring element 33. The moveable segments 84 may open of their own accord when setting rivet 95. In some embodiments, foot 124 of rivet 95 presses the moveable segments 84 apart against the force of the spring element 33. In some embodiments, when a self-piercing rivet 95 is used, moveable segments 84 may be stationary and spring element 33 may not be needed. In some embodiments, the moveable segments 84 may be in the form of a one piece ring. The moveable segments 84 each have a bearing surface 35 resting on the die mount 41. Referring to FIG. 17, the moveable segments 84 comprise a segment stop surface 43, by way of which punching forces are transmitted to the segments 84 and, by way of the bearing surface 35, to the die mount 41. The segments 84 comprise a ring boost 85 which has a forming surface 89.

The die mount 41 contains an elastically moveable annular stop 86 encircling the segments 84. The moveable annular stop 86 has an annular stop surface 87 with which at least one part (90, 92) is held. The at least one part (90, 92) is securely held by the annular stop surface 87 since the segment stop surface 43 is arranged farther away relative to the work. The distance between the segment stop surface 43 and the annular stop surface 87 may be about 0.2 mm. The moveable annular stop 86 is elastically moveable and force (as shown by arrow 99) can move the moveable annular stop 86 downward as force (according to arrow 99) compresses elastic member 88 such as, for example, a spring, a hydraulic fluid, a pneumatic actuator, a pressurized gas, and the like. In some embodiments, elastic member 88 may include a spring, an elastomer, pressurized gas, pneumatics, electronically controlled resistance, hydraulics, and the like. The moveable segments 84 form a punch opening 40 through which a punched part 102, 103 can be pressed.

In some embodiments of the die 14, according to the teachings, the annular stop 86 for ensuring mobility of the segments 84 during the operation of setting the rivet 95 comprises an annular stop surface 87 and the segments 84 comprise a segment stop surface 43, the segment stop surface 43 being located, in relation to the work, at a distance from 0.1 to 0.3 mm, preferably from 0.15 to 0.25 mm, behind the annular stop surface 87. In some embodiments, an arrangement of the stop surfaces 43, the moveable annular stop 86 of the die mount 41 is arranged closer to the parts 90, 92 than the segment 84. The result of this is that the parts 90, 92 are securely held by the annular stop 86 and that any slippage of the work during the punching operation or the riveting operation is prevented. In some embodiments, the segments 84 may be able to move radially (floating) even in pre-stressed condition of the work.

Figure 13:
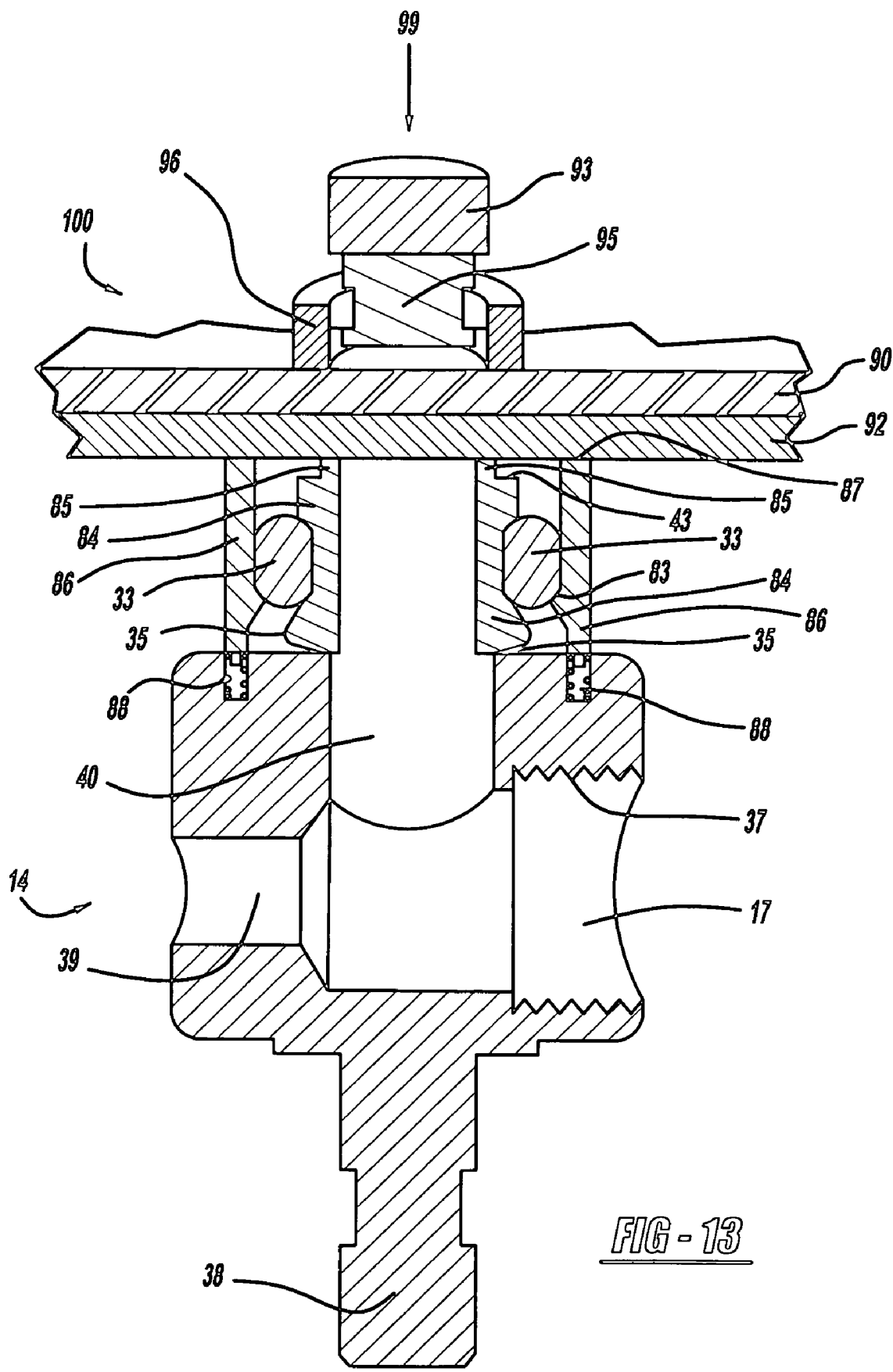
FIGS. 13-16 are cross-sectional views showing a process for fastening a subassembly employing a self-piercing rivet and a die with a moveable annular stop.

In some embodiments, annular stop 86 comprises a stop 83. Stop 83 can rest against spring element 33 and is held against spring element 33 by a force provided by the elastic member 88. As shown in FIG. 13, elastic member 88 pushes annular stop 86 upward until stop 83 makes contact with spring element 33. As force (as shown by arrow 99) used in the riveting operation moves the moveable annular stop 86 downward, and thus compressing elastic member 88, stop 83 is moved downward away from spring element 33. Stop 83 may be advantageous for providing a home position for the moveable annular stop 86 and for providing repeatability for moveable annular stop 86 returning to home position.

With the aid of a vent hole 39 and a disposal passage 17, punched parts 102, 103 are removed by means of compressed air or a vacuum. A threaded connection 37 makes possible the simple attachment of a disposal hose (not shown) to the disposal passage 17. The die mount 41 may be attached by means of a counterbearing receptacle 38 to a counterforce structure, for example, a C-stirrup (not shown).

FIG. 17 shows segment 84 of die 14 according to the teachings as in FIGS. 13-16, in a longitudinal section. The segment 84 comprises a segment stop surface 43 and a bearing surface 35, as well as a ring boost 85 and a forming surface 89. The bearing surface 35 is planar, so that punching forces can be safely transferred to the die mount 41 by way of the segment stop surface 43 and the bearing surface 35 without having the segment 84 move laterally away from the punch opening 40 radially. The segment 84 may comprise an elastic element receptacle 36 in which a spring element 33 is guided. The spring element 33 may be fabricated as an O-ring of rubber. Owing to the aspect of the segment 84, it is not necessary to lodge the individual segment 84 with the aid of a shaft. The segment 84 may be displaced radially and not be tilted.

In some embodiments, the segments 84 may be in the form of a one piece ring. The segments 84 each have a bearing surface 35 resting on the die mount 41. In some embodiments of the die 14, according to the teachings, the segments 84 comprise a substantially planar bearing surface 35 and the die mount 41 comprises a substantially planar matching surface for transmitting the punching forces to the die mount 41. Owing to the planar surfaces, great punching forces can be absorbed by the segments 84 and transmitted to the die mount 41, ensuring a stable lodgment of the segments 84 in the punching operation. In some embodiments, the segments 84 may be a ring having a surface on the interior of the ring similar to that illustrated in FIG. 11. In some embodiments, the segments 84 may be a ring having an undulating surface on the interior of the ring similar to that illustrated in FIG. 12.

In some embodiments, die 14 may comprise at least one position sensor operably sensing any or all of the following: a position of the die 14 relative to the ram 93; a position of the ram 93 relative to the die 14; a position of the holding tool 96 relative to the die 14; and/or a position of the die 14 relative to the holding tool 96. In some embodiments, die 14 may comprise at least one force sensor operably detecting a force involved in setting rivet 95. In some embodiments, the at least one force sensor 21 may be in communication with the ram 93 such that ram 93 can adjust force on rivet 95 during process and such adjusting of force is based on the communication. In some embodiments, die 14 may be in communication with a controller. In some embodiments, any one or all of the sensors may be in communication with a controller. In some embodiments, the controller may also be in communication with the ram 93, the holding tool 96, the die 14, a fastener feeder (not shown), and/or a data collection system.

In some embodiments, a die 14, according to the teachings, having a punch opening 40 of variable diameter for setting a fastening element 1 in at least one part comprises at least two moveable segments 84 to accommodate punching forces, said segments 84 forming a punch opening 40 enlargeable in diameter to accommodate a closure head 30 of the fastening element 1, said segments 84 being moveable lodged in a die mount 41 and the segments 84 being held together by at least one spring element 33.

The enlargeable punch opening 40 provides adequate space for forming a closure head 30 during the traction on the mandrel 7, backed up by the setting head 4. The closure head presses the moveable segment 84 radially outward so that the punch opening 40 is independently enlarged in diameter.

Owing to its property of being enlargeable, the die 14 may be employed, after the punching operation when the closure head 30 is formed as a stop for the work. In particular, the die 14 need not be removed after the punching operation to make room for the closure head 30. This is especially important when a plurality of parts are to be connected to each other and it is to be ensured that the parts 8, 9 do not shift against each other. With the aid of the die 14 according to the teachings, it is possible, during the entire operation of setting the fastening element 1, to keep two parts 8, 9 to be connected to each other under constant pressure, thereby improving the hole walls 11 of the riveted connection.

Owing to the mobility of the segments 84, the die 14 becomes floating, that is, upon lateral displacement of fastening element 1 and die 14, for example, because of an opening of the C-stirrup or tolerances in the fastening element 1, no scarring or scraping will occur on the periphery of the fastening element 1. Furthermore, the fastening element 1 is more effectively protected from corrosion and the die 14 from wear.

By means of the spring element 33, the segments 84 may be held together so that after completion of an operation of setting the fastening element 1, the segments 84 automatically return to their original position. This returns the die 14 according to the teachings to its original state.

The segments 84 are so formed that they are able to absorb great forces in the punching direction without becoming laterally unstable and, slipping away, but can be opened in simple manner by radial forces directed away from the punch opening 40 and generated by the forming of a closure head 30.

In some embodiments of the die 14, according to the teachings, the segments 84 can be radially displaceable. A radial displacement of the segments 84 affects an especially easy opening of the die 14. In some embodiments, the segments 84 can be formed, or mounted on an axis so that the segments 84 can execute a rotary or tilting motion.

In some embodiments of the die 14 according to the teachings, the segments 84 comprise a substantially planar bearing surface 35 and the die mount a substantially planar matching surface for transmitting the punching forces to the die mount 41. Owing to the planar bearing surfaces 35, great punching forces can be absorbed by the segments 84 and transmitted to the die mount 41, ensuring a stable lodgment of the segments 84 in the punching operation.

In some embodiments of the die 14 according to the teachings, the segments 84 comprise receptacles 36 for spring element 33. A spring element 33 is guided in the receptacles 36. This makes it possible for the segments 84, after completion of a setting operation, to return into their original position and be available for another setting operation.

In some embodiments of the die 14 according to the teachings, the die 14 comprises less than 5, in particular 4, and preferably 3 segments 84. In some embodiments of the die 14 according to the teachings, the spring element 33 is formed by a rubber ring. The spring element 33 ensures that the moveable segments 84, after completion of the operation of setting a fastening element, are automatically shifted back into their original position. In some embodiments of the die 14 according to the teachings, the spring element 33 is a spiral ring.

Figure 14:
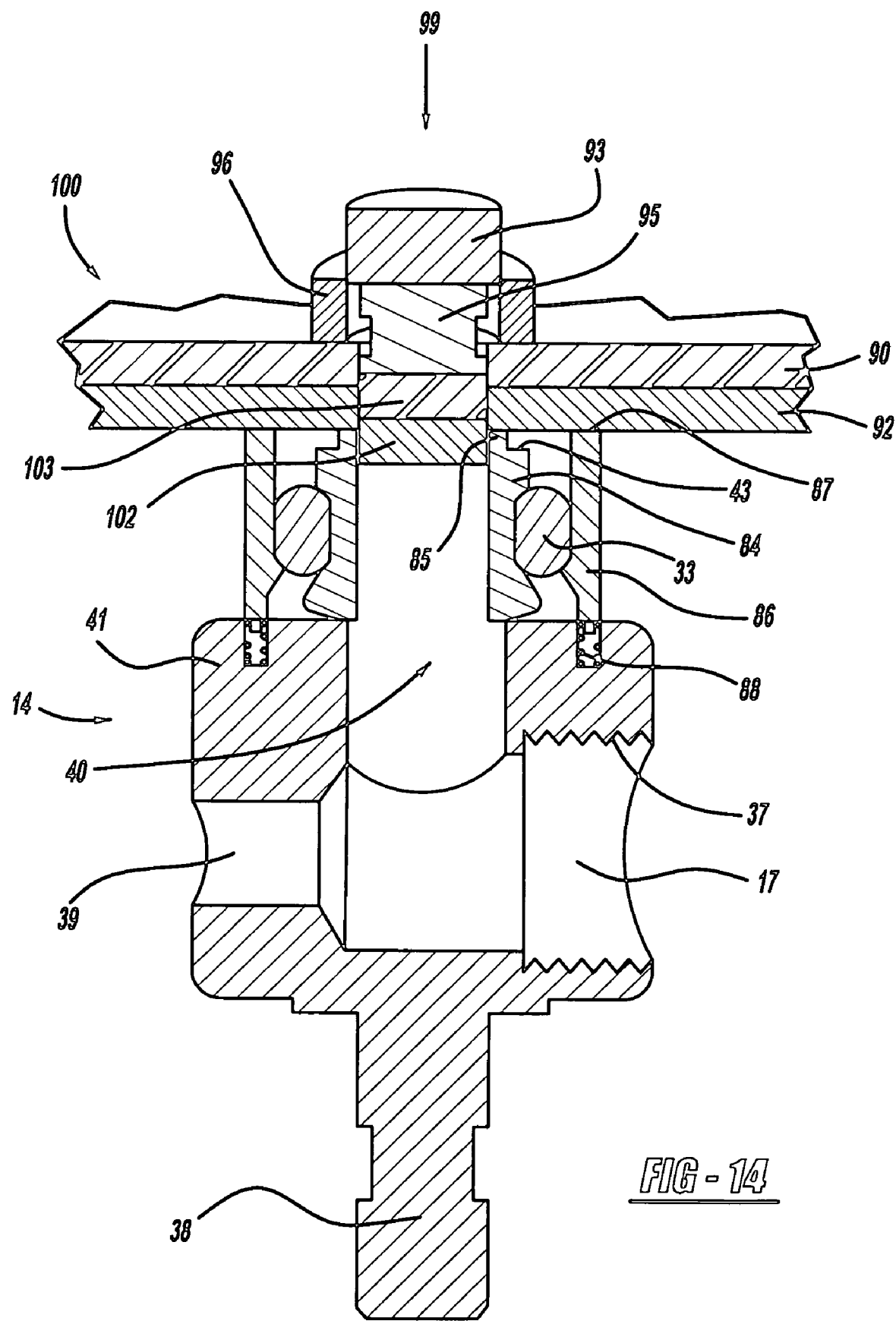
Figure 15:
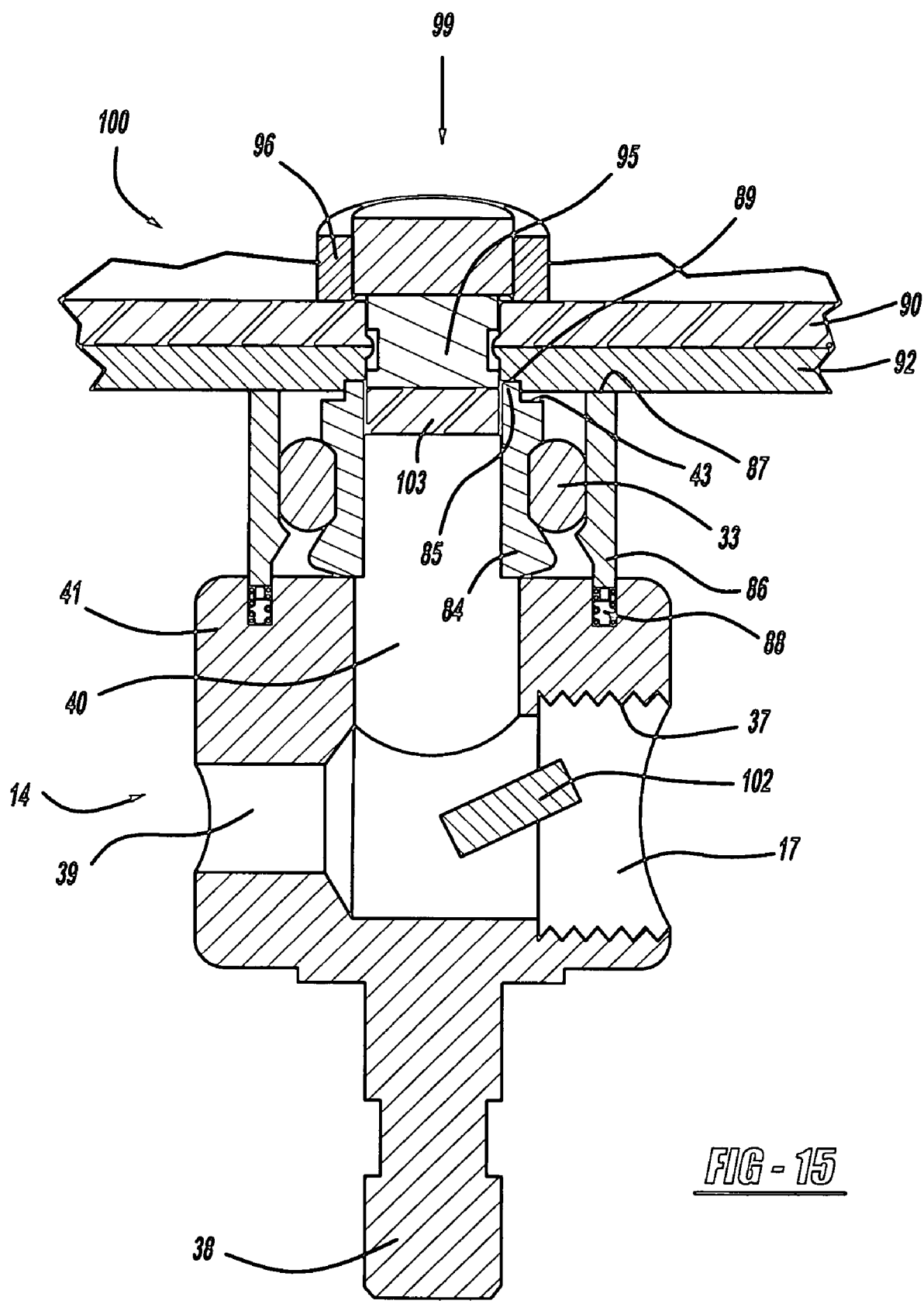

FIG. 13 shows the subassembly 100 at the beginning of a self-piercing rivet operation in which the self-piercing rivet 95, in the form of a solid rivet, is to be driven into the parts 90, 92 to be joined by means of the ram 93 in piercing direction according to arrow 99, the die 14 and the holding tool 96 serving to transmit the counterforce to the piercing forces. FIGS. 14 and 15 show the subassembly 100 during the riveting operation, recesses of corresponding shape being pierced with the help of self-piercing rivet 95 into the parts 90, 92 to be interconnected. Thus, the rivet 95 during the self-piercing rivet process serves as stamping tool. By virtue of the self-piercing by a fastening element, the rivet 95, the wall of the opening 149 results in especially advantageous properties of the riveted connection with respect to the maximum allowable tensile and shearing stresses. In some embodiments, the spring element 33 is a rubber of polymeric O-ring. In some embodiments, the spring element 33 is a metal or alloy spring.

Figure 16:
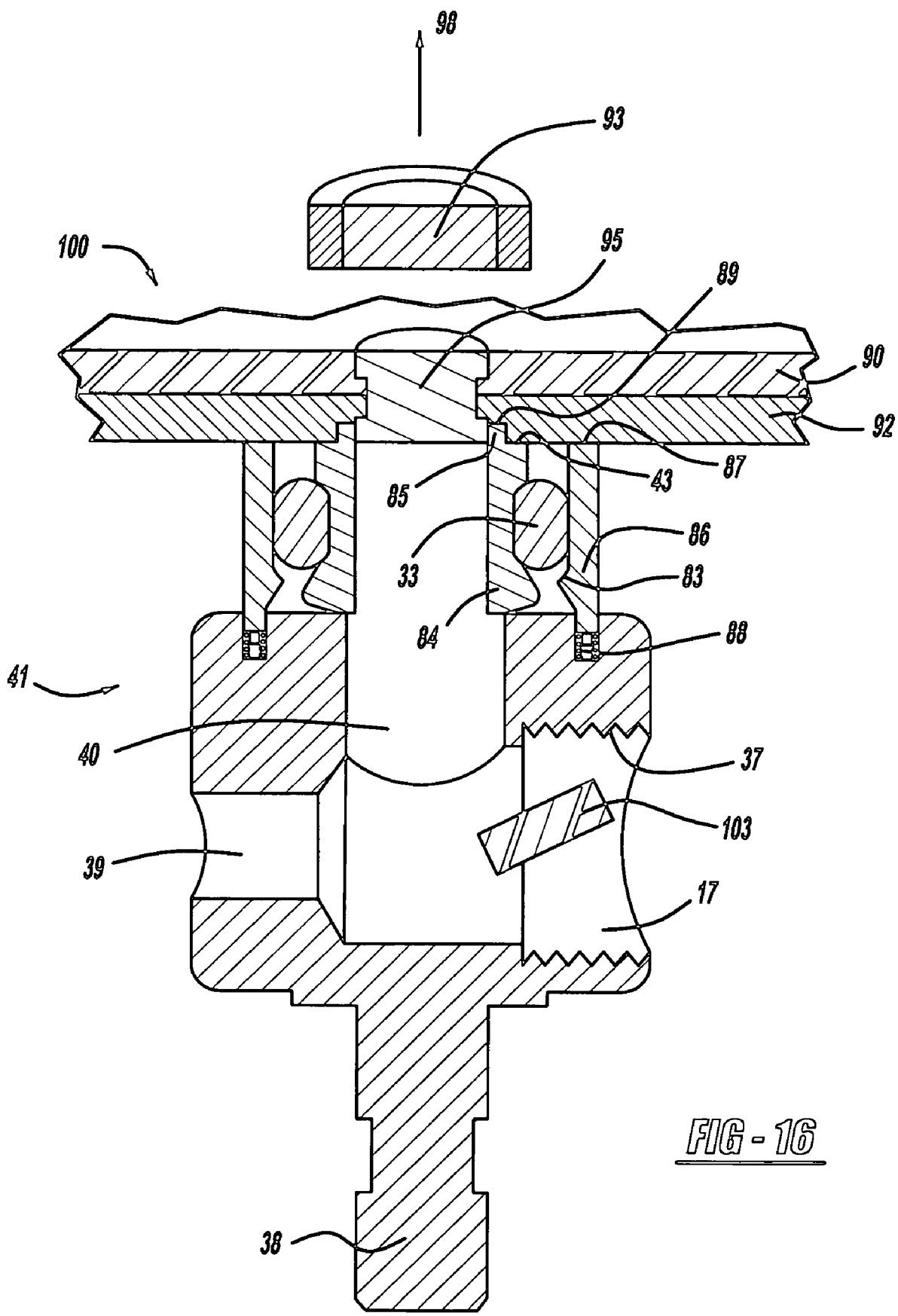

FIG. 16 shows a configured self-piercing rivet connection, the ram 93 and the holding tool 96 being moved away from the subassembly 100 according to the arrow 98. To produce the self-piercing rivet connection, the die 14 is provided with ring boost 85 extending parallel to the piercing direction (arrow 99), by means of which an undercut is formed by forming surface 89 into the anterior part 92, as viewed in piercing direction (arrow 99), by flow-pressing material from the anterior part 92 into an annular groove 120 of the self-piercing rivet 95 by means of ring boost 85.

In some embodiments, as illustrated in FIGS. 13 through 16, the operation includes attaching parts 90, 92 to die 14. In some embodiments, rivet 95 has an angular piercing surface 198 with a point 199 and the point 199 may be used for self-centering the rivet 95 on anterior workpiece 90. The operation includes a rivet 95 being driven down by ram 93 by force (arrow 99) after the parts 90, 92 are clamped with holding tool 96. In some embodiments, as ram 93 drives the rivet 95 further through parts 90, 92, the moveable segments 84 are pushed slightly outward. By driving the ram 93 further through parts 90, 92, cutting takes place creating punched parts 102, 103, and force (arrow 99) continues to increase. After the rivet 95 has been pushed through parts 90, 92, the holding tool 96 increases the clamping force (in direction of arrow 99). The increase in clamping force in the direction of arrow 99 drives the annular stop 86 downward against elastic member 88. The ring boost 85 at the top of moveable segment 84 penetrates posterior part 92 and produces an interlock. The material projection 154 of the interior part 92 is pushed into annular groove 120 in forming the interlock and this results in a permanent connection of parts 90, 92.

Figure 18:
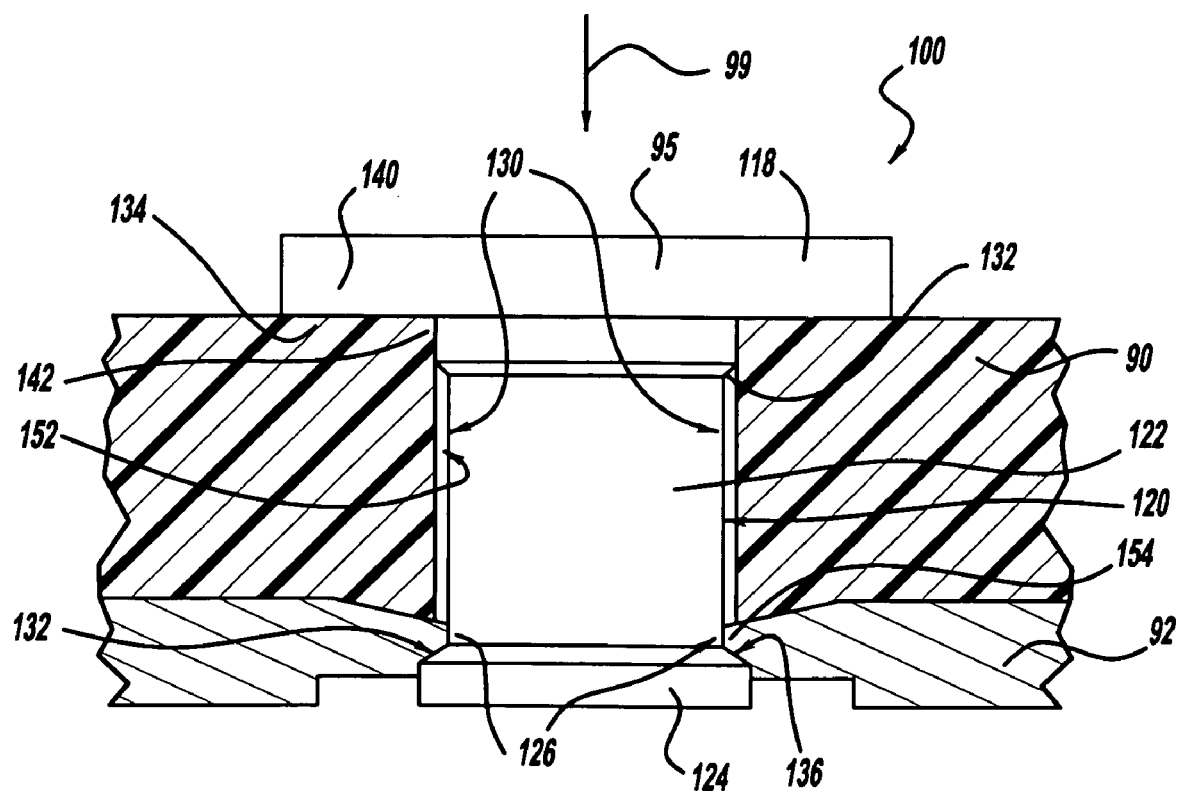
FIG. 18 is a cross-sectional view of a self-piercing solid rivet with a flat head.

FIG. 18 shows a schematic longitudinal sectional view of a subassembly 100 according to the teachings, having a positioned self-piercing rivet 95 and a standard head 138. The self-piercing rivet 95 is configured as a solid rivet, and connects the part 90, posterior in piercing direction according to arrow 99, to the corresponding anterior part 92. Here, the posterior part 90 may, for example, be made of a plastic and the anterior part 92 of a metal, for example, steel. The parts 90, 92 are not pre-drilled before attachment of the self-piercing rivet 95 so that the through opening 149 represented in FIG. 18 is produced by the piercing operation in placement of the self-piercing rivet 95. The self-piercing rivet 95 comprises a head 118, a shank 122, and a foot 124. The shank 122 is provided with an annular groove 120, the annular groove 120 extends in a lengthwise direction from a first area 126 of the anterior part 92 as viewed in piercing direction 99 into a second area 130 of the corresponding posterior part 90. The annular groove edge 132 in the first area 126 is distanced from the posterior part 90. The annular groove 120 extends in lengthwise direction from a rivet head edge 134 adjoining the shank as far as a rivet foot edge 136 bordering on the shank 122. The rivet foot edge 136 is configured as an undercut edge with respect to the anterior part 92, and serves to prevent relative motion of the positioned self-piercing rivet 95 with respect to the interconnected parts 90, 92 against the piercing direction (arrow 99). For this purpose, the rivet foot edge 136 is in contact with a matching material projection 154 of the anterior part 92, which by means of the piercing tool and in particular, by means of the ring boost 85 (see FIGS. 13 through 16) during the self-piercing rivet operation, is generated in the form of a flow pressure phenomenon. The material projection 154 of the anterior part 92 extends as far as the shank 122 of the rivet 95, and in cooperation with the rivet head edge 134, which is in contact with a corresponding edge of the posterior part 90, provides a stable shape-and-force anchorage of the self-piercing rivet 95 in the two parts 90, 92, and hence a secure connection of the two to each other.

Figure 19:
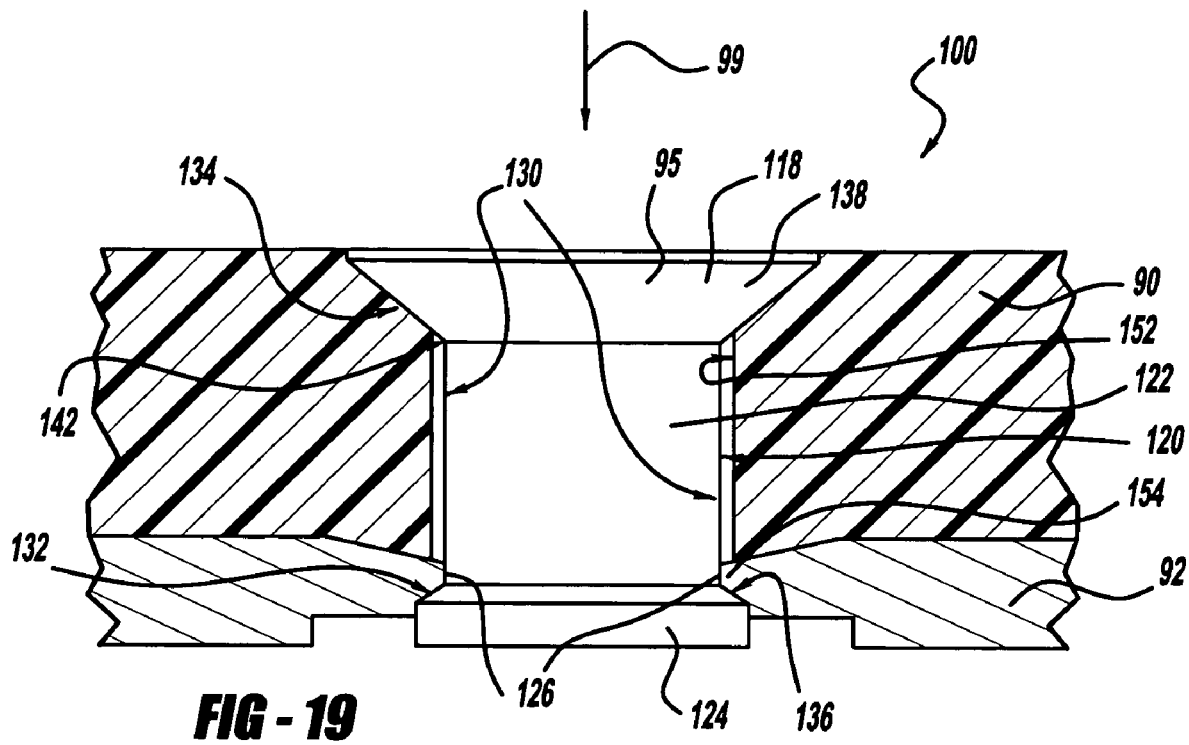
FIG. 19 is a cross-sectional view of a self-piercing solid rivet with an annular head.

The rivet head 118 in the example according to FIG. 18 is configured as a standard head 138, while the alternative example according to FIG. 19 represents a matching self-piercing rivet connection with a self-piercing rivet 95 having a head 118 configured as an oversized head 140. The self-piercing rivet 95 of either embodiment contains a transitional region 139 between the head 118 and the shank 122, the transitional region 139, as represented in FIGS. 18 and 19 being configured as a vertex. Alternatively, the transitional region 139 may be configured as a curve or as a lineal phase. Otherwise, the self-piercing rivet connections represented in FIGS. 18 and 19 are the same.

Figure 20:
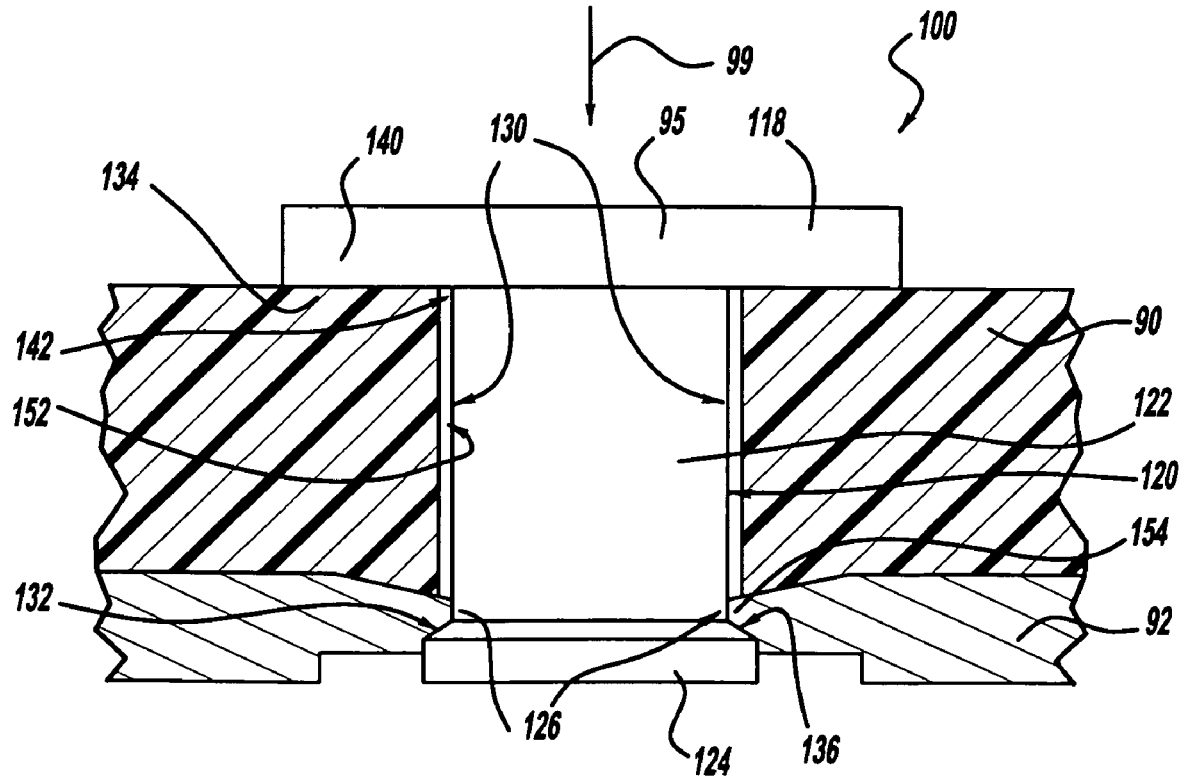
FIG. 20 is a cross-sectional view of a self-piercing solid rivet with an over-sized head.
Figure 21:
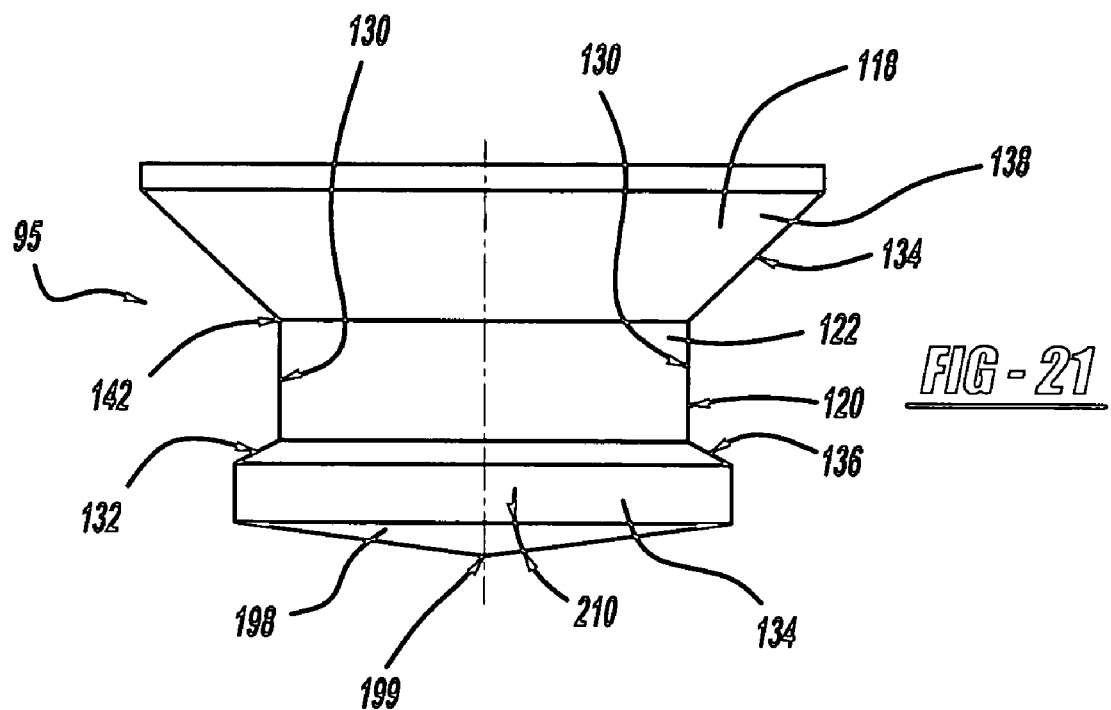
FIG. 21 is a cross-sectional view of a self-piercing rivet with an annular head and a conical surface on the opposite end.
Figure 22:
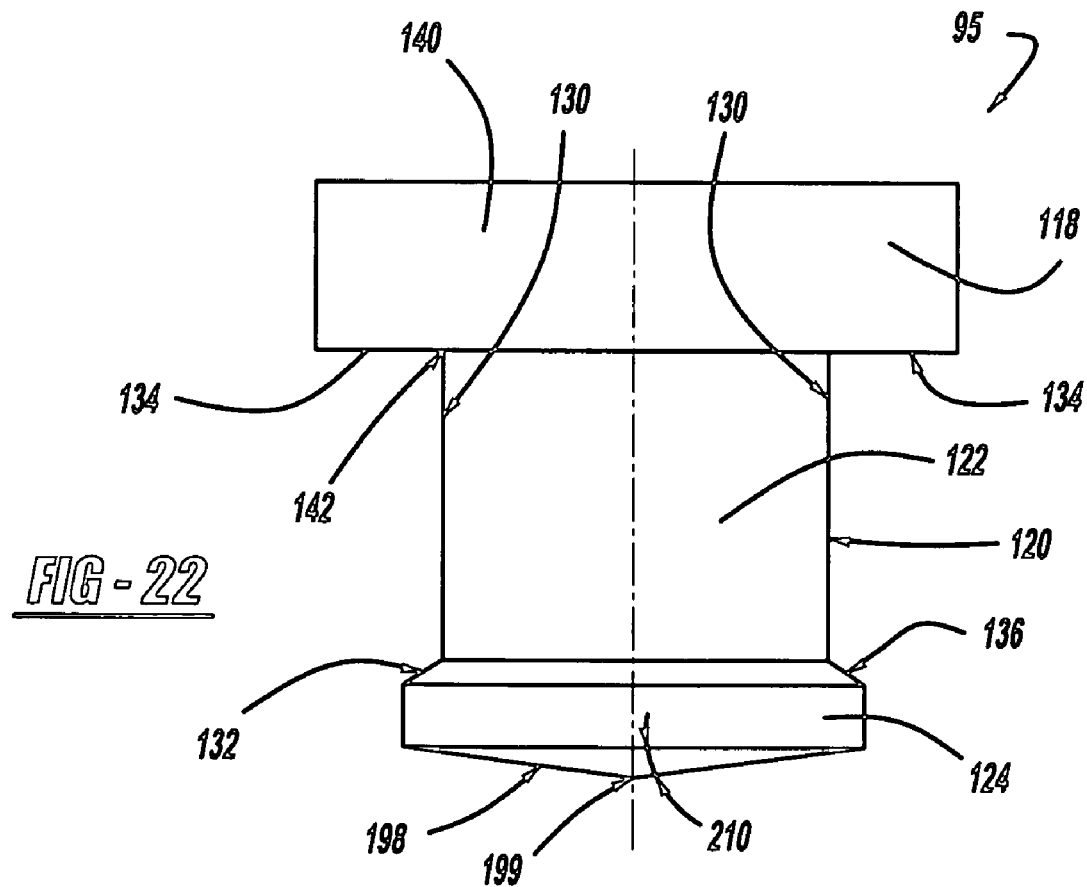
FIG. 22 is a cross-sectional view of a self-piercing rivet with an annular head and a conical surface on the other end.
Figure 23:
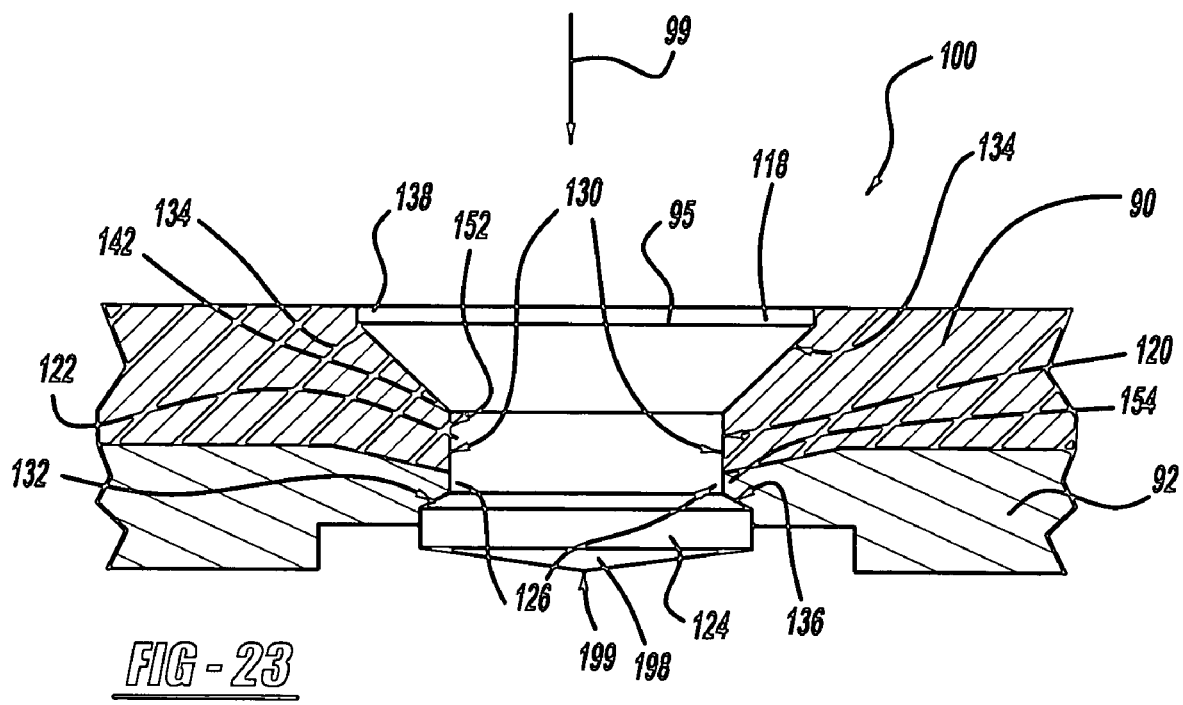
FIG. 23 is a cross-sectional view of a subassembly comprising the self-piercing rivet of FIG. 21.
Figure 24:
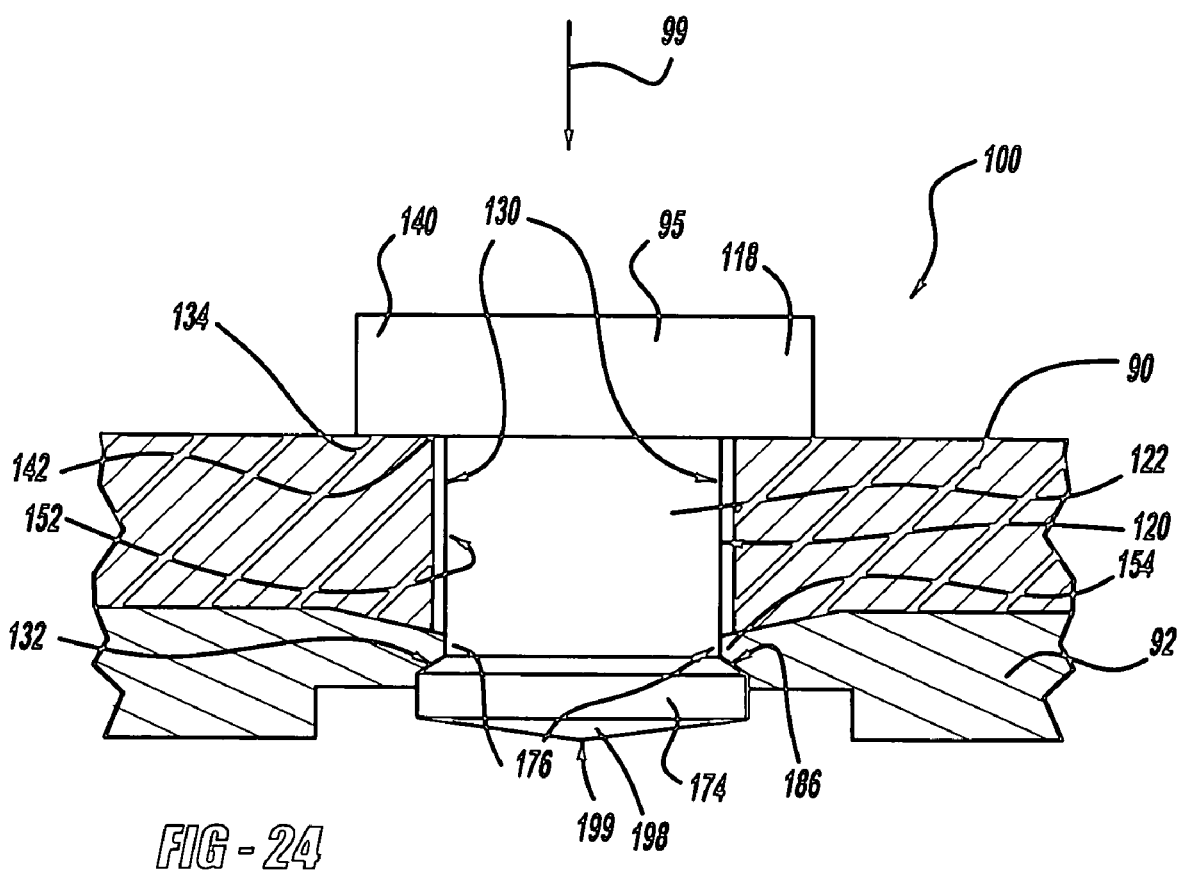
FIG. 24 is a cross-sectional view of a subassembly comprising the self-piercing rivet of FIG. 22.

FIG. 20 shows a subassembly 100 having a self-piercing rivet 95 with a head 118 in the form of an oversized head, corresponding to the subassembly 100 of FIG. 20, where in FIG. 20 the annular groove 120 does not, as in FIG. 19, extend as far as the head 118, but terminates in the second area 130 at a distance from the same (annular groove edge 132 in second area 130). At the transitional region 139, therefore, there may be a contact between the shank 122 and the posterior part 90. The remaining structural concept of the subassembly 100 of FIG. 20 corresponds to that of FIG. 19.

By means of a self-piercing rivet 95 according to FIGS. 13-20, it is possible, when punching out the part 90, made, for example, of a fiber-reinforced plastic, to avoid an undesirable drawing of the material of part 90 into the annular groove 120 in the neighborhood of the anterior part 92 (die-side part) so that a correct annular groove 120 guidance is possible with the material of the anterior part 92 (for example, metal) while forming the material projection 154.

With reference to FIGS. 21 through 24, in some embodiments, a self-piercing rivet 95 comprises an angular piercing surface 198 which may be advantageous for self-aligning and/or self-centering of rivet 95 on workpiece (posterior part 90). In some embodiments, angular piercing surface 198 may be conical in shape. In some embodiments, the angular piercing surface 198 may come to a point 199. In some embodiments, the angular piercing surface 198 has an angle 210 of less than 10°. In some embodiments, the angular piercing surface 198 has an angle 210 of less than 5°. In some embodiments, the angular piercing surface 198 has an angle 210 of about 3°. In some embodiments, the angular piercing surface 198 can fasten parts 90, 92 and the tip of the point 199 is on the same plane as the bottom most surface of part 92.

All literature and similar materials cited in this application, including, but not limited to, patents, patent applications, articles, books, treatises, and internet web pages, regardless of the format of such literature and similar materials, are expressly incorporated herein by reference in their entirety for any purpose. In the event that one or more of the incorporated literature and similar materials differs from or contradicts this application, including, but not limited to, defined terms, term usage, described techniques, or the like, this application controls.

Some embodiments and the examples described herein are exemplary and not intended to be limiting in describing the full scope of compositions and methods of these teachings. Equivalent changes, modifications, and variations of some embodiments, materials, compositions, and methods can be made within the scope of the present teachings, with substantially similar results.

What is claimed is:

1. A device comprising:
 a fastening element having a shaft, a head on one end of the shaft and a piercing surface on an opposite end of the shaft;
 a ram assembly operably punching the piercing surface through at least one part; and
 a die having:
  a die mount;
  a movable die segment having:
   a bearing surface resting upon the die mount;
   a segment stop surface oppositely directed with respect to the bearing surface; and
   a ring boost extending freely away from the segment stop surface and operating to penetrate the at least one part until the segment stop surface contacts the at least one part; and
 an elastically moveable annular stop operably forming a connection of the element to the at least one part.

2. The device according to claim 1 further comprising a holding tool operably holding the at least one part against the die.

3. The device according to claim 2 wherein the ram and the holding tool are moveable relative to the die independently of each other.

4. The device according to claim 1 wherein the die comprises a disposal passage.

5. The device according to claim 4 wherein the die comprises a vacuum in communication with the disposal passage.

6. The device according to claim 5 wherein the die comprises a pressured air source in communication with the disposal passage.

7. The device according to claim 1 further comprising a counterforce structure adapted to dynamically interlock the ram and the die.

8. The device according to claim 1 wherein the shaft comprises an annular groove.

9. The device according to claim 1 wherein the at least one part is a metal sheet and the element is a rivet.

10. The device according to claim 1 wherein the at least one part is part of a motor vehicle.

11. The device according to claim 1 further comprising at least one force sensor operably detecting a force involved in setting a fastening element.

12. The device according to claim 1 further comprising a conical shape on the piercing surface.

13. The device according to claim 12 wherein the conical shape has an angle of less than 10° as compared to a flat surface.

14. The device according to claim 1 further comprising a second head on the opposite end of the shaft.

15. The device according to claim 1 further comprising a tip on the piercing surface, the tip operably self-centering the element on the at least one part.

16. The device according to claim 1 further comprising an annular groove in the shaft, the annular groove operably facilitating the connection of the element to the at least one part.

17. The device according to claim 1 further comprising a stepped surface on a forming region of the ring boost.

18. The device according to claim 1 wherein the moveable annular stop further comprises at least one of a spring, a hydraulic fluid, pneumatic actuator, or a pressurized gas.

19. The device according to claim 1, wherein the annular stop is positioned circumferentially about the movable segment preventing lateral displacement of the movable segment.

20. The device according to claim 19, wherein the annular stop includes an annular stop surface and the movable segment includes a segment stop surface, the segment stop surface being located, in relation to the at least one part, at a distance from the annular stop surface.

21. The device according to claim 1, Wherein the annular stop is arranged closer to the at least one part than the movable segment such that the at least one part is securely held by the annular stop.

* * * * *